United States Patent
Chung et al.

(10) Patent No.: US 10,868,762 B2
(45) Date of Patent: Dec. 15, 2020

(54) SYSTEMS AND METHODS FOR MOBILITY MANAGEMENT IN A DISTRIBUTED SOFTWARE DEFINED NETWORK PACKET CORE SYSTEM

(71) Applicant: Google LLC, Mountain View, CA (US)

(72) Inventors: Bok Knun Randolph Chung, Los Altos, CA (US); Hassan Sipra, San Jose, CA (US); Ankur Jain, Mountain View, CA (US)

(73) Assignee: Google LLC, Mountain View, CA (US)

( * ) Notice: Subject to any disclaimer, the term of this patent is extended or adjusted under 35 U.S.C. 154(b) by 262 days.

(21) Appl. No.: 15/270,846

(22) Filed: Sep. 20, 2016

(65) Prior Publication Data

US 2017/0086115 A1 Mar. 23, 2017

Related U.S. Application Data

(60) Provisional application No. 62/222,406, filed on Sep. 23, 2015, provisional application No. 62/242,668, (Continued)

(51) Int. Cl.
*H04L 12/803* (2013.01)
*H04W 28/08* (2009.01)
(Continued)

(52) U.S. Cl.
CPC .......... *H04L 47/125* (2013.01); *H04L 41/042* (2013.01); *H04L 41/044* (2013.01);
(Continued)

(58) Field of Classification Search
CPC ....... H04L 47/125; H04L 45/42; H04L 45/64; H04L 45/44; H04L 45/56; H04L 45/74;
(Continued)

(56) References Cited

U.S. PATENT DOCUMENTS 8,111,630 B2 2/2012 Kovvali et al.
8,521,905 B2 8/2013 Beliveau et al.
(Continued)

FOREIGN PATENT DOCUMENTS

CN 102938910 A 2/2013
CN 104023335 A 9/2014
(Continued)

OTHER PUBLICATIONS

Yuhong Li, et al., Software Defined Networking for Distributed Mobility Management, Globecom 2013 Workshop, Dec. 13, 2013, pp. 885-889 (Year: 2013).*

(Continued)

*Primary Examiner* — Joshua Kading
(74) *Attorney, Agent, or Firm* — Lerner, David, Littenberg, Krumholz & Mentlik, LLP

(57) ABSTRACT

A distributed software defined network (SDN) packet core system includes a plurality of interconnected local mobility domains (LMDs). Each LMD includes a plurality of radio access technology (RAT) specific front-end modules associated with at least one RAT and a mobility manager. Each RAT-specific front-end module is configured to handle intra-RAT and intra-LMD mobility events that involve switching connectivity of client devices between two radio access points coupled to the LMD and associated with a first common RAT that is also associated with that RAT-specific front-end module. The mobility manager is coupled to the front-end modules and is configured to handle intra-RAT and inter-LMD mobility events. The mobility manager can also be configured to handle inter-RAT and intra-LMD mobility events if the SDN packet core system supports more than one RAT.

19 Claims, 7 Drawing Sheets

Related U.S. Application Data filed on Oct. 16, 2015, provisional application No. 62/242,677, filed on Oct. 16, 2015.

(51) Int. Cl.

| | | |
|---|---|---|
| *H04W 36/08* | (2009.01) | |
| *H04W 36/14* | (2009.01) | |
| *H04L 12/721* | (2013.01) | |
| *H04L 29/12* | (2006.01) | |
| *H04L 29/06* | (2006.01) | |
| *H04L 12/24* | (2006.01) | |
| *H04L 29/08* | (2006.01) | |
| *H04L 12/717* | (2013.01) | |
| *H04W 36/00* | (2009.01) | |
| *H04L 12/26* | (2006.01) | |
| *H04L 12/715* | (2013.01) | |
| *H04W 28/10* | (2009.01) | |
| *H04W 24/04* | (2009.01) | |
| *H04W 72/04* | (2009.01) | |
| *H04W 40/36* | (2009.01) | |
| *H04W 88/10* | (2009.01) | |
| *H04W 36/36* | (2009.01) | |

(52) U.S. Cl.
 CPC ...... *H04L 41/0893* (2013.01); *H04L 43/0817* (2013.01); *H04L 45/42* (2013.01); *H04L 45/44* (2013.01); *H04L 45/64* (2013.01); *H04L 61/2007* (2013.01); *H04L 61/6022* (2013.01); *H04L 67/1004* (2013.01); *H04L 67/1029* (2013.01); *H04L 67/288* (2013.01); *H04L 69/22* (2013.01); *H04W 24/04* (2013.01); *H04W 28/08* (2013.01); *H04W 28/10* (2013.01); *H04W 36/00* (2013.01); *H04W 36/0011* (2013.01); *H04W 36/08* (2013.01); *H04W 40/36* (2013.01); *H04W 72/0426* (2013.01); *H04L 43/0852* (2013.01); *H04W 36/14* (2013.01); *H04W 36/36* (2013.01); *H04W 88/10* (2013.01)

(58) Field of Classification Search
 CPC ............... H04L 45/745; H04L 43/0817; H04L 43/0852; H04L 41/044; H04L 41/0893; H04L 61/2007; H04L 61/6022; H04L 69/22; H04L 45/563; H04W 36/0005; H04W 36/0009; H04W 36/0027; H04W 36/0011; H04W 36/06; H04W 36/08; H04W 36/14; H04W 36/165; H04W 36/22; H04W 36/36; H04W 28/10; H04W 24/04; H04W 40/36; H04W 72/0426; H04W 88/10
 See application file for complete search history.

(56) References Cited

U.S. PATENT DOCUMENTS

| | | | | |
|---|---|---|---|---|
| 9,264,944 | B1* | 2/2016 | Brewer | H04W 36/0016 |
| 10,069,648 | B2* | 9/2018 | Suzuki | H04L 12/4641 |
| 2007/0053334 | A1* | 3/2007 | Sueyoshi | H04L 12/2856 |
| | | | | 370/338 |
| 2007/0115906 | A1 | 5/2007 | Gao et al. | |
| 2009/0094611 | A1 | 4/2009 | Danne et al. | |
| 2011/0044218 | A1 | 2/2011 | Kaur et al. | |
| 2012/0106333 | A1 | 5/2012 | Lee et al. | |
| 2012/0204224 | A1* | 8/2012 | Wang | H04L 67/2819 |
| | | | | 726/3 |
| 2012/0300615 | A1 | 11/2012 | Kempf et al. | |
| 2013/0021933 | A1 | 1/2013 | Kovvali et al. | |
| 2013/0054761 | A1 | 2/2013 | Kempf et al. | |
| 2013/0094472 | A1* | 4/2013 | Klingenbrunn | H04W 36/023 |
| | | | | 370/331 |
| 2013/0139243 | A1* | 5/2013 | Poola | H04L 63/0236 |
| | | | | 726/11 |
| 2013/0242727 | A1 | 9/2013 | Shaikh | |
| 2013/0272127 | A1 | 10/2013 | Ali et al. | |
| 2013/0297798 | A1 | 11/2013 | Arisoylu et al. | |
| 2013/0329601 | A1 | 12/2013 | Yin et al. | |
| 2014/0038654 | A1 | 2/2014 | Ahmadi | |
| 2014/0101726 | A1 | 4/2014 | Gupta et al. | |
| 2014/0269284 | A1 | 9/2014 | Amanna, III et al. | |
| 2014/0341199 | A1* | 11/2014 | Jeon | H04L 67/2842 |
| | | | | 370/338 |
| 2014/0348130 | A1 | 11/2014 | Kaippallimalil et al. | |
| 2015/0055623 | A1 | 2/2015 | Li et al. | |
| 2015/0063346 | A1 | 3/2015 | Eswara et al. | |
| 2015/0103665 | A1 | 4/2015 | Kaippallimalil et al. | |
| 2015/0124622 | A1 | 5/2015 | Kovvali et al. | |
| 2015/0124815 | A1 | 5/2015 | Beliveau et al. | |
| 2015/0382240 | A1* | 12/2015 | Hecht | H04L 69/22 |
| | | | | 370/316 |
| 2016/0127889 | A1* | 5/2016 | Cui | H04W 36/08 |
| | | | | 370/328 |
| 2016/0156513 | A1* | 6/2016 | Zhang | H04W 4/70 |
| | | | | 709/220 |
| 2016/0301595 | A1* | 10/2016 | Ashida | H04L 69/22 |
| 2016/0315785 | A1* | 10/2016 | Dronadula | H04L 12/4633 |
| 2016/0381146 | A1* | 12/2016 | Zhang | H04L 67/141 |
| | | | | 709/228 |
| 2018/0248713 | A1* | 8/2018 | Zanier | H04L 12/4633 |

FOREIGN PATENT DOCUMENTS

| | | | | |
|---|---|---|---|---|
| CN | 104301146 A | | 1/2015 | |
| JP | 2010081605 A | * | 4/2010 | ............ H04W 36/38 |
| JP | 2014531792 A | | 11/2014 | |
| JP | 2015008407 A1 | * | 1/2015 | ............ H04W 36/10 |
| JP | 2015146470 A | | 8/2015 | |
| JP | 2016524827 A | | 8/2016 | |
| WO | 2010057198 A1 | | 5/2010 | |
| WO | WO-2011037197 A1 | * | 3/2011 | ............ H04W 8/12 |
| WO | WO-2014209007 A1 | * | 12/2014 | ............ H04L 41/04 |
| WO | 2015009939 A1 | | 1/2015 | |
| WO | WO-2015009939 A1 | * | 1/2015 | ............ H04W 36/12 |
| WO | 2015105987 A1 | | 7/2015 | |

OTHER PUBLICATIONS

International Preliminary Report on Patentability under Chapter II dated Dec. 5, 2017 in International (PCT) Application No. PCT/US2016/052674.

Aricent, Demystifying Routing Services in Software-Defined Networking, (c) 2013 Aricent Group. Retrieved from http://www3.aricent.com/demystifying-routing-services-in-sdn-whitepaper/ on Sep. 20, 2016 (12 pages).

Aruba Networks, Aruba HybridControl™ Architecture for Service Providers (c) 2013 Aruba Networks, Inc. Retrieved from http://www.arubanetworks.com/pdf/solutions/TB_Aruba_HybridControl.pdf on Sep. 20, 2016 (12 pages).

Avaya, When SDN meets Mobility, (c) 2015 Avaya Inc. Retrieved from https://www.avaya.com/en/documents/when-sdn-meets-mobility-dn7711.pdf on Sep. 20, 2016 (6 pages).

Giust, Fabio, et al. HDMM: Deploying client and network-based Distributed Mobility Management, Telecommunication Systems, vol. 59, No. 2, pp. 247-270, Jun. 2015.

Heinonen, Johanna, et al. Dynamic Tunnel Switching for SDN-Based Cellular Core Networks. Retrieved from https://pdfs.semanticscholar.org/4120/2d4907550dfbec2096bb07997f6dba838f66.pdf on Sep. 20, 2016 (12 pages).

Heinonen, Johanna, et al. Dynamic Tunnel Switching for SDN-Based Cellular Core Networks, Proceedings of the 4th workshop on All things cellular: operations, applications, & challenges, ACM, pp. 27-32, Aug. 2014.

Hummel, Karin Anna. ATCN 2014: SDN- Mobility and SDN: Mobility Management and Mobile Networks. etrieved from http://

(56) References Cited

OTHER PUBLICATIONS docplayer.net/10260348-Atcn-2014-sdn-mobility-and-sdn-mobility-management-and-mobile-networks.html on Sep. 20, 2016 (18 pages).

Jain, Sushant, et al. B4: Experience with a globally-deployed software defined WAN, ACM SIGCOMM Computer Communication Review vol. 43, No. 4, pp. 3-14, Sep. 2013.

Lippis III, Nicholas John, A Software-Defined Networking Approach to Branch Office Routing, A Lippis Consulting Industry Paper, Feb. 2013. Retrieved from http://www.cisco.com/c/dam/en/us/products/collateral/unified-communications/hosted-collaboration-solution-hcs/cloud_connector_sdn.pdf on Sep. 20, 2016 (8 pages).

Liu, D. L., et al. Cloud Based Mobile Core Network Problem Statement, Network Working Group. Retrieved from https://tools.ietf.org/id/draft-liu-dmm-deployment-scenario-01.html on Sep. 20, 2016 (6 pages).

Mevico Celtic Telecommunications Solutions, Advanced EPC Architecture for Smart Traffic Steering, Document Identifier D2.2, Jan. 31, 2013. Retrieved from http://citeseerx.ist.psu.edu/viewdoc/download?doi=10.1.1.464.9537&rep=rep1&type=pdf on Sep. 20, 2016 (93 pages).

Vanbever, Laurent, On integrating Software-Defined Networking within existing routing systems, Stanford University Networking Seminar, Nov. 13, 2013. Retrieved from http://netseminar.stanford.edu/seminars/11_13_13.pdf on Sep. 20, 2016 (97 pages).

International Search Report and Written Opinion dated Dec. 1, 2016 in PCT Application No. PCT/US2016/052674.

Invitation to Pay Additional Fees and, Where Applicable, Protest Fee dated Dec. 1, 2016 in PCT Application No. PCT/US2016/052676.

International Search Report and Written Opinion dated Jan. 2, 2017 in PCT Application No. PCT/US2016/052679.

Li, Yuhong, et al. Software Defined Networking for Distributed Mobility Management, In 2013 IEEE Globecom Workshops, Dec. 2013, pp. 885-889, IEEE.

Morelli, Arianna. Final Architecture Design, Mar. 3, 2015, pp. 1-79, retrieved from URL: http://www.ict-crowd.eu/downloads/deliverable/CROWD_D1.3_V1.1.pdf.

Seite, Pierrick. Initial Specification of Connectivity Management Concepts and Architecture, Sep. 30, 2013, pp. 1-103, retrieved from URL: http://www.ict-crowd.eu/downloads/deliverable/CROWD_D4_1.pdf.

International Search Report and Written Opinion dated Jan. 24, 2017 in PCT Application No. PCT/US2016/052676.

Japanese Office Action dated Oct. 23, 2018 in Japanese Patent Application No. 2018-504266, and English translation thereof (7 pages).

Extended European Search Report issued in European Patent Application No. 16849427.6 (15 pages).

Office Action for European Patent Application No. 16849427.6 dated Feb. 19, 2020. 5 pages.

First Examination Report for Indian Patent Application No. 201747045877 dated May 15, 2020. 6 pages.

Notification of the First Office Action for Chinese Patent Application No. 201680050430.1 dated May 6, 2020. 8 pages.

Nguyen, Van-Giang et al. SDN and Virtualization-Based LTE Mobile Network Architectures: A Comprehensive Survey. Wireless Personal Communications, Springer, Dordrecht, NL, vol. 86, No. 3, Aug. 6, 2015 (Aug. 6, 2015), pp. 1401-1438, XP035935761, ISSN: 0929-6212, DOI: 10.1007511277-015-2997-7.

Extended European Search Report for European Patent Application No. 20178447.7 dated Jul. 7, 2020. 10 pages.

Notification of the First Office Action for Chinese Patent Application No. 201680050429.9 dated Jul. 30, 2020. 7 pages.

First Examination Report for Indian Patent Application No. 201847003245 dated Aug. 24, 2020. 8 pages.

* cited by examiner

SYSTEMS AND METHODS FOR MOBILITY MANAGEMENT IN A DISTRIBUTED SOFTWARE DEFINED NETWORK PACKET CORE SYSTEM

CROSS-REFERENCE TO RELATED APPLICATIONS

This application claims priority to U.S. Provisional Application No. 62/222,406, filed Sep. 23, 2015, entitled "DISTRIBUTED SOFTWARE DEFINED WIRELESS PACKET CORE SYSTEM"; U.S. Provisional Application No. 62/242,668, filed Oct. 16, 2015, entitled "SYSTEMS AND METHODS FOR MOBILITY MANAGEMENT IN A DISTRIBUTED SOFTWARE DEFINED NETWORK PACKET CORE SYSTEM"; and U.S. Provisional Application No. 62/242,677, filed Oct. 16, 2015, entitled "SYSTEMS AND METHODS FOR LOAD BALANCING IN A DISTRIBUTED SOFTWARE DEFINED NETWORK PACKET CORE SYSTEM," the contents of all of which are incorporated herein by reference.

FIELD OF THE DISCLOSURE

The present disclosure relates generally to the field of wireless communication networks.

BACKGROUND

More users are switching to (or are more often using) mobile networks to access the Internet to communicate. Since many mobile devices are equipped with communication capabilities associated with a variety of radio access technologies, users have the flexibility to switch between distinct radio access networks based, for instance, on availability, cost, network performance or a combination thereof.

SUMMARY

According to at least one aspect of this disclosure, a distributed software defined network (SDN) packet core system includes a plurality of interconnected local SDN infrastructure instances. Each local SDN infrastructure instance corresponds to a respective local mobility domain (LMD) and includes a plurality of processors arranged geographically in proximity, and communicatively coupled, to a respective plurality of radio access technology (RAT) specific access points. The processors for each local SDN infrastructure instance are configured to execute a plurality of RAT-specific front-end modules and a mobility manager. The plurality of RAT-specific front-end modules are associated with at least one RATs. Each RAT-specific front-end module is configured to handle intra-RAT and intra-LMD mobility events that involve switching connectivity of client devices between two radio access points coupled to the local SDN infrastructure instance and associated with a first common RAT that is also associated with that RAT-specific front-end module. The mobility manager is coupled to the front-end modules and is configured to handle intra-RAT and inter-LMD mobility events that involve switching connectivity of client devices between two radio access points coupled to separate local SDN infrastructure instances and associated with a second common RAT.

According to at least one aspect of this disclosure, a method of managing mobility events in a distributed software defined network (SDN) packet core system includes a SDN mobility controller receiving a handover request associated with a client device switching connectivity between a first radio access point and a second radio access point. The SDN mobility controller is located within a local SDN infrastructure instance among a plurality of local SDN infrastructure instances of the distributed SDN packet core system. The first and second radio access points are associated with distinct radio access technologies (RATs) and are served by the local SDN infrastructure instance. The method includes, responsive to the handover request, the SDN mobility controller sending a request to a mobility manager of the local SDN infrastructure instance to update a first binding between an Internet protocol (IP) address of the client device and a first IP address of a first front-end module serving the client device. The method also includes the mobility manager modifying the first IP address of the first RAT-specific front-end module with a second IP address of a second RAT-specific front-end module. The first and second RAT-specific front-end modules are located in the local SDN infrastructure instance and are associated with different RATs. The method also includes the SDN mobility controller sending a request to the second RAT-specific front-end module requesting an update of a second binding between an identifier of the client device and a first identifier of the first radio access point. The method also includes the second RAT-specific front-end module updating the second binding by changing the first identifier of the first access point with a second identifier of the second access point. The method also includes the SDN mobility controller sending a handover response to the client device via the first radio access point.

DETAILED DESCRIPTION

Figure 1:
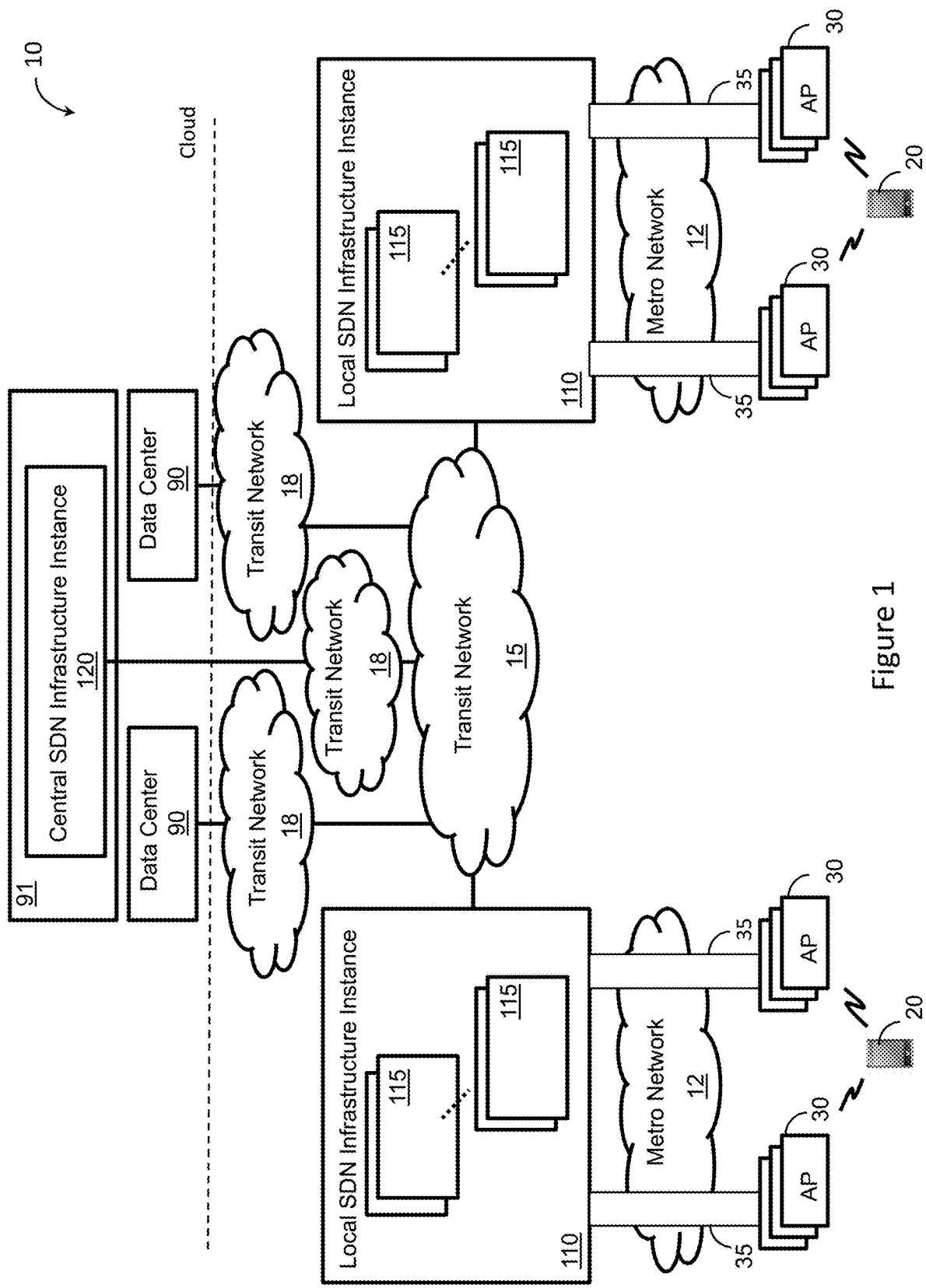
FIG. 1 shows a block diagram illustrating an overview of an example communication environment employing a distributed software defined network (SDN) packet core system.

Increasing numbers of mobile users and increasing volumes of mobile data traffic call for continuous and costly investments in network infrastructure by mobile network operators. Mobile users are more frequently accessing content provider data through a variety of wireless access networks. Mobile devices can be equipped with capabilities for accessing different radio access networks associated with different radio access technologies (RATs) such as $3^{rd}$ generation (3G) mobile telecommunications technology, long-term evolution (LTE) mobile telecommunications technology, Wi-Fi, proprietary high-altitude platforms or other radio access technologies.

When accessing the Internet, a mobile user can switch between different modes of connectivity depending on a respective user context. For instance, the mobile user can access the Internet through Wi-Fi at home, through cellular access networks outdoors or through guest Wi-Fi services in retail spaces, airports or other public places. Users usually have different ways to authenticate themselves to distinct access networks, different billing arrangements and different security guarantees or policies. Also, roaming between distinct access networks results in connectivity interruption. These factors lead to a fragmented user experience. Mobile users would appreciate a unified service that provides a combination of heterogeneous radio access solutions with seamless mobility between various RATs.

One of the ways to improve user experience is to provide a system architecture that enables cohesion of heterogeneous radio access networks into a single service domain. In designing such system architecture, different factors are to be considered, including system scalability (e.g., with respect to new RATs or with respect increase in network capacity), system complexity, infrastructure cost, intra-RAT mobility and inter-RAT mobility. With regard to mobility, in particular, providing seamless mobility across a plurality of radio access networks associated with at least two distinct RATs poses several technical challenges. First, communication networks associated with distinct RATs tend to employ distinct mobility functions and different anchor points. Such mobility functions are usually computationally intensive. As such, implementing separate mobility functions for distinct RATs can significantly increase the complexity and the cost of the system architecture as the number of supported RATs increases. Also, providing seamless inter-RAT mobility may require implementing interworking solutions to allow communication between separate mobility functions and coordination between anchor points associated with distinct RATs. Implementing such interworking solutions can be complex and can also hinder the scalability of the system architecture with respect to new RATs. Second, scalability of the system architecture depends on the scalability of the mobility functions associated with various RATs. For instance, the amount of state information maintained and processed by mobility functions increases linearly with the number of client devices served by the system. If the mobility functions are not scalable, increases in the number of client devices served can lead to unacceptable service latency. Third, mobility is a latency sensitive network function. For instance, the length of communication links between client devices and the network devices executing the mobility functions can have substantial effect on service latency. Accordingly, designing the system architecture that enables cohesion of heterogeneous radio access networks can involve taking into account the effect of the distribution of mobility functions within the system on service latency.

In this disclosure, a distributed software defined network (SDN) packet core system is configured to operate as a large scale single service domain providing cohesion of heterogeneous radio access networks. The distributed SDN packet core system can provide seamless connectivity to end users independent of the access network to which they connect and enables transparent mobility between separate access networks. The distributed SDN packet core system is also referred to herein as a distributed virtual evolved packet core (vEPC) system.

FIG. 1 shows a block diagram illustrating an overview of a communication environment 10 employing a distributed software defined network (SDN) packet core system. The communication environment 10 can include a plurality of radio access points (APs) 30 serving mobile devices 20 in their proximity, a plurality of local SDN infrastructure instances 110, a central SDN infrastructure instance 120, one or more metropolitan area networks 12, a first transit network 15, one or more second transit networks 18 and one or more data centers 90. Each local SDN infrastructure instance 110 can include a plurality of computer devices 115 configured to execute network functions for serving mobile devices 20 in the proximity of that SDN infrastructure instance 110.

The mobile devices 20 can include without limitation a mobile phone, smart phone, tablet, laptop, smart watch, wearable item with communications capabilities, audio playing device (such as an MP3 player), video playing device, gaming device, global positioning system (GPS) device, automotive computer or any other client device with communication capabilities. The mobile device 20 can attach to a mobile access network via wireless links at respective access points 30. In some implementations, the mobile device 20 can be configured to request and access content associated with a content provider network via the distributed SDN packet core system. For instance, an application (such as a browser, media player, game application/ platform, email application, enterprise application, social media application, cloud application or the like) running on the mobile device 20 can request content available from a data center 90 for display on a screen of the mobile device 20.

The radio access points (APs) 30 can be configured to communicate with mobile devices 20 via wireless links. The APs 30 can be part of separate radio access networks (such as a Wi-Fi hotspot network, universal mobile telecommunications system (UMTS) network, long-term evolution (LTE) network or any other mobile communication network) associated with at least two distinct radio access technologies (RATs) such as 3G, LTE, LTE-A, Wi-Fi or other RATs. For instance the APs 30 can include a Node B, evolved Node B (eNode B), Wi-Fi hotspot access point or radio access points of other types. The APs 30 can be distributed over a large geographical area defining one or more states, a country or multiple countries. Each AP 30 can be configured to serve mobile devices 20 in a respective geographical neighborhood. Each AP 30 can be configured to communicate directly with mobile devices 20 in its neighborhood through an air interface and can be coupled to a respective local SDN infrastructure instance 110 through a metro ISP network 12. As a mobile device 20 moves from one geographical location to another, the respective wireless connection can be transferred (or handed over) from one AP 30 to another based on the proximity of the mobile device 20 to distinct APs 30.

The plurality of local SDN infrastructure instances 110 represent a set of distributed computing or network processing resource pools deployed in close proximity to and serving radio access networks or the APs 30 thereof. For instance, each SDN infrastructure instance 110 can be associated with a respective metropolitan area and can be coupled to APs 30 serving mobile devices 20 within that metropolitan area. Each local SDN infrastructure instance 110 can include a respective plurality (such as a dozen, few dozens, or other number) of computer devices 115, such as computer servers or racks of servers configured to carry out network operations or functions implemented as SDN elements to serve data traffic associated with APs 30 coupled (or served) by that local SDN infrastructure instance 110. In some implementations, the computer devices 115 associated with a respective local SDN infrastructure instance 110 can be configured to carry out latency sensitive network functions. For instance, control-plane signaling, data plane anchoring and mobility operations can be implemented as SDN elements executable by (or running on) the respective computer devices 115.

In some implementations, each local SDN infrastructure instance 110 can include load balancing entities configured to balance the load between the respective computer devices 115 or the SDN elements running thereon. In some implementations, each local SDN infrastructure instance 110 can be configured to locally cache Internet data associated with one or more content providers, cloud data, intranet data or a combination thereof. For instance, each local SDN infrastructure instance 110 can include one or more caching servers. The local SDN infrastructure instance 110 can be configured to serve Internet data in response to requests from mobile devices 20 from local caches whenever the requested Internet data is locally cached. Internet data can include webpages, data associated with online services (such as email, social media, etc.), data associated with games, video streaming data (such as Netflix or YouTube), or the like. In some implementations, the local SDN infrastructure instances 110 can be configured to locally cache (and serve) Internet data, intranet data, cloud data or a combination thereof.

The central SDN infrastructure instance 120 can include one or more computer devices with SDN elements running thereon and configured to carry out network functions that are not (or are at least less) latency sensitive or network functions involving multiple local SDN infrastructure instances 110. The SDN elements running in the central SDN infrastructure instance 120 can include, for instance, a subscription policy module, a global module for managing mobility (or roaming) between local SDN infrastructure instances 110 or a combination thereof. The subscription policy module can include an authorization, authentication and accounting (AAA) server, subscription profile repository (SPR), policy and charging control module or other module for managing subscription policies. During attachment of a mobile device 20 to the distributed SDN packet core system, a local SDN infrastructure instance 110 can request authentication or authorization of a mobile device 20 (or a user thereof) from a subscription and policy module associated with the central SDN infrastructure instance 120. The central SDN infrastructure instance 120 also can include a global load balancing module for balancing load between the plurality of local SDN infrastructure instances 110. The central SDN infrastructure instance 120 can be arranged in the cloud, such as in a host data center 91.

Each local SDN infrastructure instance 110 can be coupled to APs 30 in its proximity through a respective metropolitan area network 12. The metropolitan area networks 12 can differ from one local SDN infrastructure instance 110 to another. In some implementations, a local SDN infrastructure instance can be coupled to respective APs 30 through one or more metropolitan area networks 12. For a given local SDN infrastructure instance 110, the respective metropolitan area network(s) 12 can be one or more communications networks serving a metropolitan area associated with that local SDN infrastructure instance 110. In some implementations, one or more of the metropolitan area networks 12 can be owned or managed by respective third-party network providers and may not be part of the distributed SDN packet core network. In some implementations, one metropolitan area network 12 can serve multiple local SDN infrastructure instances 110. In some implementations, each AP 30 can be coupled to (and served by) the geographically closest local SDN infrastructure instance 110. In some implementations, coupling between the APs 30 and entities (such as computer devices 115 or SDN element (s) running thereon) within the local SDN infrastructure instance 110 can be achieved through respective transport tunnels 35 over the metropolitan area network(s) 12. For instance, transport tunnels 35, such as Ethernet-over-IP (EoIP) tunnels, can be used over metropolitan area networks 12 that provide IP connectivity to local SDN infrastructure instances 110. In some implementations, the transport tunnels 35 can include an Ethernet-over-IP tunnel, generic user datagram protocol (UDP) encapsulation (GUE) tunnel, generic route encapsulation (GRE) tunnel, 802.11 over GUE tunnel, GPRS tunneling protocol (GTP) tunnel, Internet Protocol (IP) security (IPSec) tunnel, other type of tunnel or a combination thereof.

In some implementations, the plurality of local SDN infrastructure instances 110 can be inter-connected through a first transit network 15. The first transit network 15 allows for communication between separate local SDN infrastructure instances 110, for instance, to handle mobility (or roaming) and signaling between local SDN infrastructure instances 110. In some implementations, the first transit network 15 can be configured to couple the local SDN infrastructure instances 110 to the central infrastructure instance 120. The first transit network 15 can include a fiber-optic data network, an Internet service provider (ISP) network or other communication network. The first transit network 15 and the plurality of local SDN infrastructure instances 110 can be managed (or owned) by a single entity or separate entities. In some implementations, the first transit network 15 can be owned or managed separately from the local SDN infrastructure instances 110. That is, the first transit network 15 may not be part of the distributed SDN packet core system but rather an external network used to communicatively couple the local SDN infrastructure instances 110 to each other.

The communication environment 10 can include a plurality of data centers 90. Each data center 90 can include computing devices for storing and providing access to content provider data, web pages, cloud data or a combination thereof. For instance, the data centers 90 can be configured to receive data requests from the local SDN infrastructure instances 110 and, in response, provide the requested data. The data centers 90 can be configured to host web pages and respective content, video streaming applications such as YouTube or Netflix, social media applications and content, gaming applications, enterprise applications or any other cloud applications or services. In some implementations, the central SDN infrastructure instance(s) 120 can be implemented within the host data center 91.

Each local SDN infrastructure instance 110 can be communicatively coupled to the data centers 90 through one or more second transit networks 18. The second transit network (s) 18 can be coupled to the local SDN infrastructure instances 110 through the first transit network 15. In some implementations, the second transit network(s) 18 can be directly coupled to the local SDN infrastructure instances 110. In some implementations, the second transit network(s) 18 can be configured to couple the central SDN infrastructure instance 120 to the local infrastructure instances 110. In some implementations, the second transit network(s) 18 can be optional. In such implementations, the data centers 90 can be directly coupled to the first transit network 15. In some implementations, the first and second transit networks 15 and 18 can be part of a single communications network.

In some implementations, the distributed SDN packet core system can be viewed as the combination of the local SDN infrastructure instances 110 and the central SDN infrastructure instance 120. In some implementations, the distributed SDN packet core system can also include the first transit network 15. In some implementations, the distributed SDN packet core system can also include the second transit network(s) 18. The architecture of the distributed SDN packet core system (as described with respect to FIG. 1) allows for data traffic to be routed and broken-out locally, for instance, at the local SDN infrastructure instances 110. Arranging local SDN infrastructure instances 110 at close proximity to APs 30 and processing data traffic therein allows for fast data packet processing and therefore improved performance and reduced network resources consumption.

The distributed SDN packet core system can be widely distributed across a large geographical area (such as one or more states or one or more countries) and configured to track and manage mobility of a large number of mobile devices 20 distributed over the large geographical area. Mobility tracking and management can be carried out by SDN-based mobility functions implemented within the distributed SDN packet core system. Software implementation of mobility functions allows for the scalability and optimization of such functions. However, latency and scalability associated with the mobility functions can depend on the respective software implementation employed. For instance, when employing Network Function Virtualization (NFV) to implement separate mobility functions (such as the mobility management entity (MME) for LTE) for distinct RATs in the cloud (such as in data center(s) 90 or 91), scalability for a given RAT is usually achieved by replicating all mobility functions associated with that RAT. Replicating highly complex functions associated with large amounts of maintained states can lead to inefficient use of power and computational resources, especially if increased mobility processing resources are needed within a subset of the local SDN infrastructure instances. Also, replicating mobility functions would call for the synchronization of respective states and therefore further increase the complexity of the packet core system. Furthermore, implementing the mobility functions in the cloud can result in high mobility processing latency. In particular, while local SDN infrastructure instances 110 may be arranged in proximity to population centers (associated with large congregations of users or respective mobile devices 20), data centers (such as data centers 90 and 91) tend to be located in remote geographic locations. Accordingly, in the case where mobility functions are implemented in the cloud, processing of each mobility event involves signaling over long communication links between the data center 91 and one or more local SDN infrastructure instances 110.

In the current disclosure, a hierarchical mobility model is employed for handling mobility events within the distributed SDN packet core system. The hierarchical mobility model can be configured to distinguish between different types of user mobility events such as mobility events indicative of mobility across APs 30 served by the same local SDN infrastructure instance 110 versus mobility events spanning across more than one local SDN infrastructure instance 110. The hierarchical mobility model also allows for distinguishing and handling inter-RAT mobility events involving switching user device connectivity between access points associated with different radio access technologies (RATs) in implementations where the distributed SDN packet core system supports multiple RATs. Such implementations should not be interpreted as limiting since, in general, the distributed SDN packet core system and respective local SDN infrastructure instances 110 can be configured to support one or more RATs.

Figure 2A:
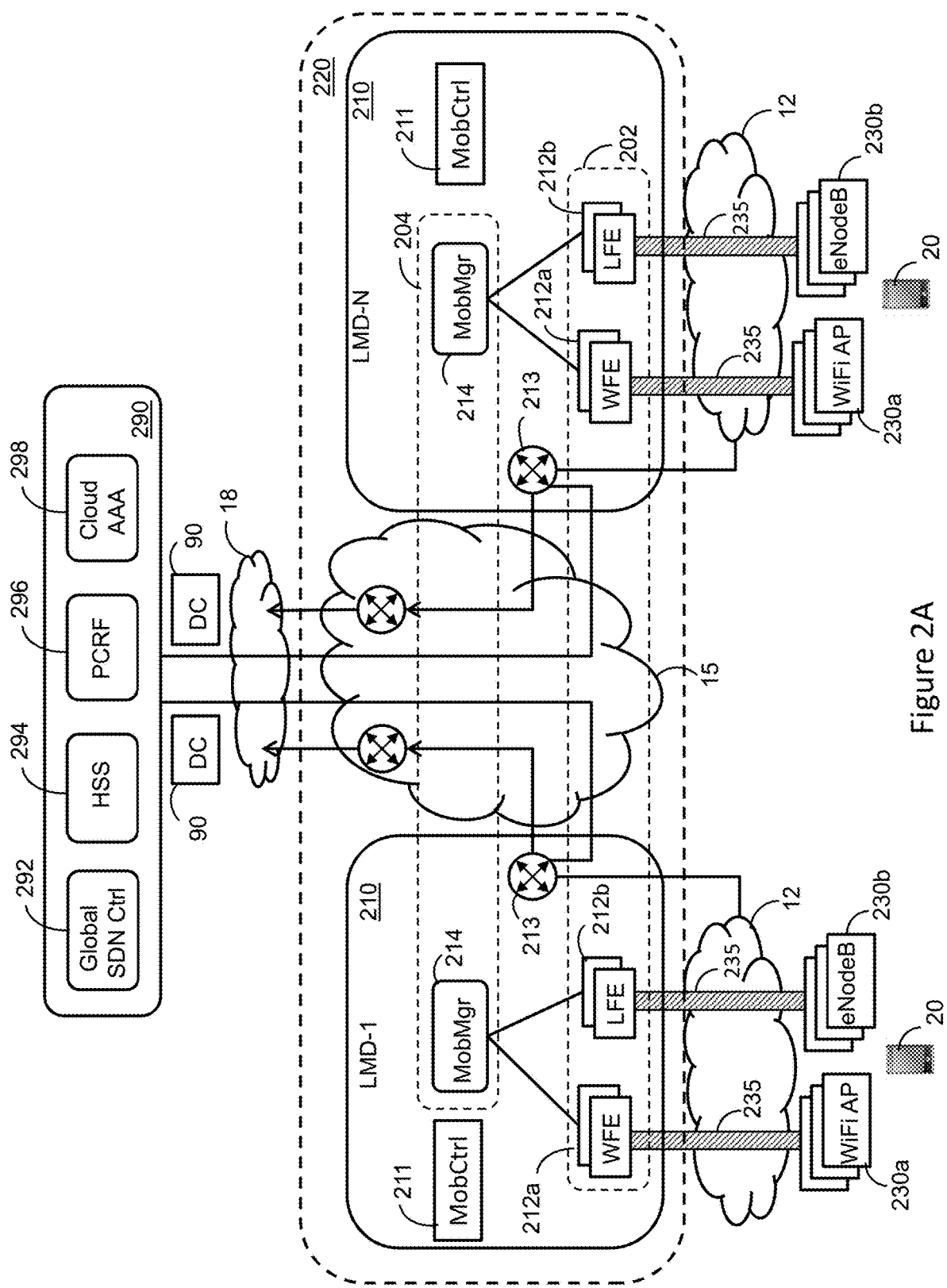
FIGS. 2A and 2B are block diagrams illustrating an example hierarchical mobility model for handling mobility events within the distributed SDN packet core system shown in FIG. 1.
Figure 2B:
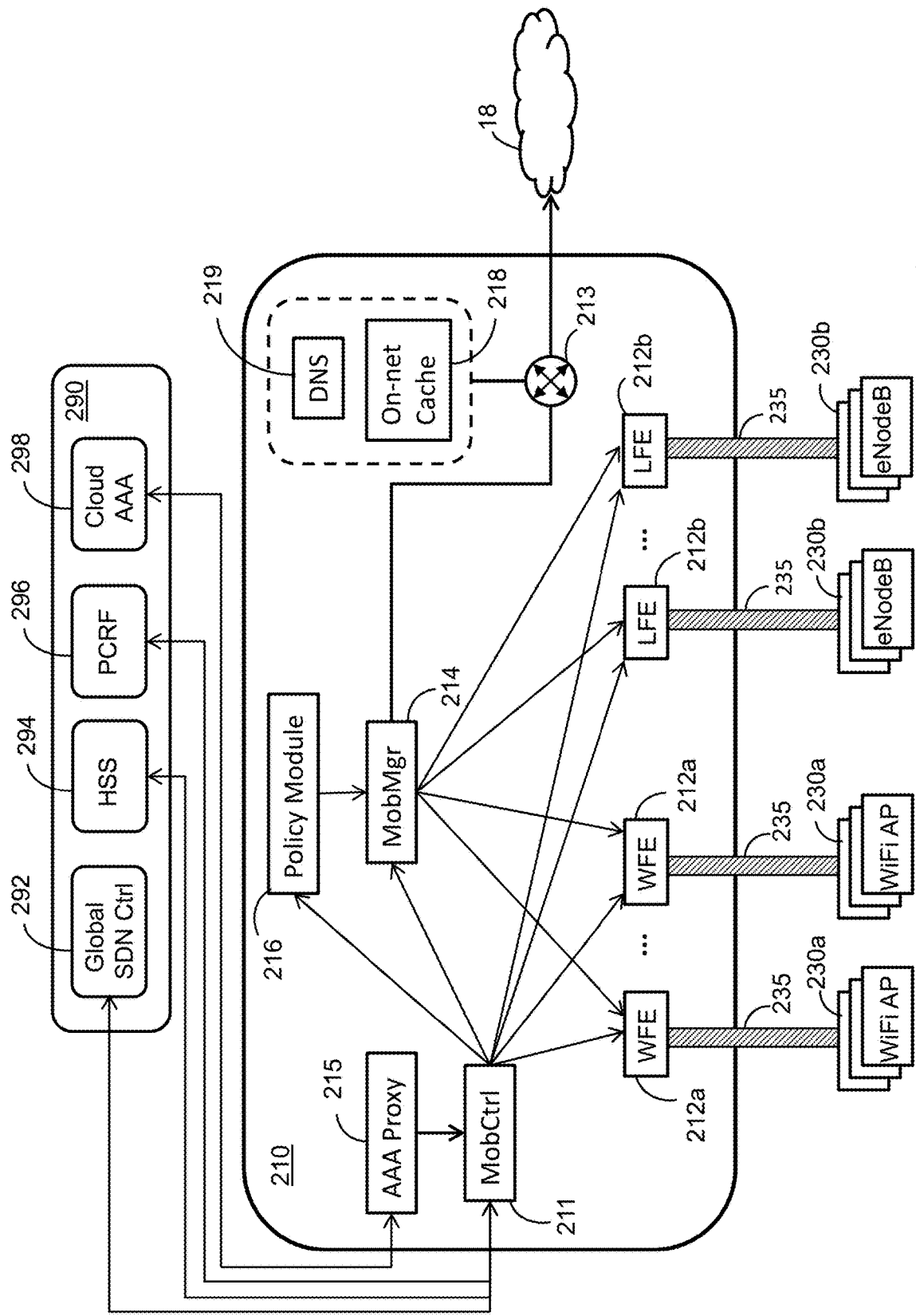

FIGS. 2A and 2B are block diagrams illustrating an example hierarchical mobility model 200 for handling mobility events within the distributed SDN packet core system shown in FIG. 1. FIG. 2A is a block diagram illustrating an overview of the hierarchical mobility model 200. The hierarchical mobility model 200 includes a cloud-based central SDN mobility instance 290, a plurality of local mobility domains (LMDs) 210 and an extended mobility domain (EMD) 220 including the plurality of local mobility domains (LMDs) 210. The cloud-based central SDN mobility instance 290 can be part of the central SDN infrastructure instance 120 (shown in FIG. 1). The cloud-based central SDN mobility instance 290 includes a global SDN mobility controller 292, a home subscriber server (HSS) module 294, a policy and charging rules function (PCRF) module 296 and a cloud authentication, authorization and accounting (AAA) module 298. Each LMD 210 corresponds to a respective local SDN infrastructure instance 110 (shown in FIG. 1), whereas the EMD 220 represents the combination of or a subset of the LMDs 210 in the distributed SDN packet core system. As shown, each LMD 210 includes a plurality of Wi-Fi front-end (WFE) modules 212a and LTE front-end (LFE) modules 212b (also referred to individually or collectively as RAT-specific front-end (FE) module(s) 212). Each WFE module 212a can be communicatively coupled to one or more respective Wi-Fi APs 230a through the metropolitan area networks 12. Each LFE module 212b can be communicatively coupled to one or more evolved nodes B (eNodeBs) 230b through the metropolitan area networks 12. In some implementations, the LMDs 210 can include any combination of FE modules 212 including WFE modules 212a, LFE modules 212b, 3G FE modules or other FE modules associated with other RATs. The LMDs 210 can be communicatively coupled to one another through a first transit network 15. The LMDs 210 can be communicatively coupled to one or more data centers 90 and the cloud-based central SDN mobility instance 290 through one or more second transit networks 18.

The hierarchical mobility model 200 can be viewed as a two-tier mobility model. In particular, the hierarchical mobility model 200 includes a first tier (also referred to as tier-1) mobility layer including the RAT-specific FE modules 212 across the plurality of LMDs 210 within the EMD 200 and a second tier (also referred to as tier-2 mobility layer including the mobility managers 214 across a plurality of LMDs 210 within the EMD 220. Tier-1 mobility is also referred to herein as layer-2 (L2) mobility because tier-1 mobility events are tracked based on L-2 (open systems interconnection (OSI) layer-2) identifiers of mobile devices such as the media access control (MAC) addresses. Tier-1 mobility is also referred to herein as MAC-layer mobility. Tier-1 (or L2) mobility events include intra-LMD mobility events for any single RAT supported by the hierarchical mobility model. That is, L2 mobility events include events where a mobile device 20 roams between APs 230 associated with a given RAT within a single LMD. Tier-2 mobility is also referred to herein as layer-3 (L3) mobility because tier-2 mobility events are tracked based on L3 (OSI L3) identifiers of mobile devices such as the IP addresses. Tier-2 (or L3) mobility events include inter-LMD mobility events and inter-RAT mobility events. An inter-LMD mobility event is a mobility event involving a mobile device roaming between two APs 230 that are associated with a given RAT and that are located in two separate LMDs 210. An inter-RAT mobility event is a mobility event between two APs 230 associated with distinct RATs but located in a single LMD 210.

As described in further details below, management and handling of L2 mobility events can be self-contained within, and optimized for, the RAT-specific FE modules 212 forming the tier-1 mobility layer 202. The RAT-specific FE modules 212 can be configured to act as mobility anchors for the RAT-specific APs 230. Tier-2 mobility events can be handled by the mobility managers 214 forming the tier-2 mobility layer 204. The mobility managers 214 are configured to act as Internet Protocol (IP) anchors for mobile devices 20 served by the EMD 220. The hierarchical mobility model can allow for distinction between, and separate processing of, intra-LMD and inter LMD mobility events. Since the majority of handover (or mobility) events tend to occur within a small geographic area (such as a metropolitan area), the LMDs 210 can be arranged such that most of the user mobility events are handled as intra-LMD mobility events. For instance, each LMD 210 (or local SDN infrastructure instance 110) can be arranged to serve a respective metropolitan area. Mobile devices 20 associated with users residing in a given metropolitan area can attach to the LMD 210 serving that metropolitan area and can associate that LMD 210 as a respective home-LMD (hLMD). Accordingly, most (such as 85%, 90%, 95% or other percentage) of user mobility events can be handled by hLMDs of respective users.

FIG. 2B is a block diagram illustrating SDN components and inter-component interactions for a local mobility domain (LMD) 210 and a cloud-based central SDN mobility instance 290. The LMD 210 includes a mobility controller 211, one or more WFE modules 212a, one or more LTE front-end (LFE) modules 212b, a mobility manager 214, an authentication, authorization and accounting (AAA) proxy module 215, a policy module 216 and one or more network switches 213 for directing data packets internally or outside the LMD 210. The LMD 210 can optionally include an on-network cache 218 for locally storing Internet or cloud data and a domain name system (DNS) module 219 for mapping domain names to Internet Protocol (IP) addresses of respective cached data in the on-network cache 218.

Referring to FIGS. 2A and 2B, each LMD 210 can be configured to serve a respective plurality of RAT-specific APs 230. In general, each LMD 210 can support one or more RATs. In some implementations, an LMD can support multiple RATs. The RAT-specific APs 230 can include Wi-Fi APs (or Wi-Fi hotspot APs) 230a, evolved nodes B (eNodeB) 230b associated with LTE, Nodes B (NodeB) associated with 3G networks, other radio access points or a combination thereof. That is, while FIGS. 2A and 2B show Wi-Fi APs 230a and eNodeBs 230b, in general, the distributed SDN packet core system can serve any combinations of APs 230. A mobile device 20 can attach to the distributed SDN packet core network via one of the RAT-specific APs 230. For instance, the mobile device 20 can attach to a given RAT-specific AP 230 associated with a given RAT based on, for instance, signal strength, communication cost or user subscription with respect to each RAT supported by the LMD 210. Each RAT-specific AP 230 associated with a given RAT can be communicatively coupled to a corresponding RAT-specific FE module 212 associated with that RAT through the metropolitan area network 12. For instance, the Wi-Fi APs 230a served by a LMD 210 can be communicatively coupled to WFE modules 212a in that LMD 210. Similarly, eNodeBs 230b served by the LMD 210 can be communicatively coupled to LFE modules 212b of that LMD 210. In general, each of at least two LMDs 210 in the distributed SDN packet core system include RAT-specific FE modules 212 that are associated with one or more RATs.

In some implementations, each RAT-specific FE module 212 can be configured to communicate with a corresponding RAT-specific AP 230 via one or more overlay transport tunnels 235. For instance, each WFE module 212a can be configured to communicate with a WiFi AP 230a via an Ethernet-over-IP (EoIP) tunnel. In such instances, a WFE module 212a can be configured to maintain a respective set of anycast EoIP endpoints for use by WiFi AP 230a to establish EoIP tunnels with that WFE module 212a. In some implementations, EoIP tunnels can be established between WFE modules 212a and WiFi APs 230a according to a pseudo-stateless model. For instance, the global SDN mobility controller 292 can be configured to advertise the WFE modules 212a, respective network locations, respective anycast tunnel endpoints or a combination thereof over the metropolitan area network(s) 12. A WiFi AP 230a can receive the advertised data and determine a WFE module 212a with which to establish an EoIP tunnel. Using the EoIP tunnel, the WiFi AP 230a can autonomously tunnel data, such as UE 802.3 frames, to the WFE module 212a. In some implementations, the overlay transport tunnel 235 coupling a RAT-specific AP 230 to a respective RAT-specific FE module 212 can include a Generic UDP Encapsulation (GUE) tunnel, Generic Route Encapsulation (GRE) tunnel, Ethernet-over-GRE tunnel, 802.11-over-GUE tunnel, general packet radio service (GPRS) Tunneling Protocol (GTP) tunnel, Internet Protocol security (IPSec) tunnel or other communication tunnel.

In some implementations, each RAT-specific FE module 212 can be configured to maintain a list of layer-two (L2) bindings for mobile devices 20 served by that RAT-specific FE module 211. That is, for each mobile device 20 served by a first RAT-specific FE module 212, the first RAT-specific FE module 212 can be configured to maintain a binding of a layer-two (L2) identifier of the mobile device 20 (UE-ID) and a L2 identifier of the respective serving RAT-specific AP 230 (such as serving-AP-ID). The L2 identifier of the mobile device 20 (UE-ID) can include the respective MAC address of the mobile device 20. The L2 identifier of the serving AP 230 (serving-AP-ID) can include a tunnel endpoint identifier (TED) associated with the transport tunnel 235 between the serving AP 230 and the first RAT-specific FE module 212. For mobile devices 20 served by other RAT-specific FE modules 212 (such as a second FE module 212 different than the first FE module 212 but associated with the same RAT as the first FE module 212), the first RAT-specific FE module 212 can maintain an indication of the RAT-specific FE module 212 serving each mobile device 20.

In some implementations, each RAT-specific FE module 212 can be configured to maintain a forwarding database (FDB), such as a table, for use in forwarding data packets (or data frames) received from (or destined to) mobile devices 20. In some implementations, the FDB maintained by a given RAT-specific FE module 212 associated with a respective RAT can include forwarding information (or forwarding rules) related to all (or a subset of) the mobile devices 20 served by the EMD 220 using that RAT. For instance, a FDB maintained at the WFE module 112a can include forwarding rules for one or more mobile devices served by the EMD 220 through Wi-Fi. As an illustrative example, Table 1 shows an example of a FDB associated with a WFE module 212a.

Consider the following example. The mobile device UE-1 is served by WFE module WFE-1 (in LMD-1 210) through a respective WiFi access point AP-1-1-1. Let UE-2 and UE-3 be mobile devices 20 served by LMD-N 210. The mobile device UE-2 is served by WFE module WFE-N-1 (in LMD-N 210) through a respective WiFi access point AP-N-1-1. The mobile device UE-3 is served by WFE module WFE-N-2 (in LMD-N 210) through a respective WiFi access point AP-N-2-1. Table 1 shows an example of a FDB (or a portion thereof) maintained at the WFE module WFE-1-1. For each mobile device 20 (such as UE-1) served by the WFE module WFE-1-1, the FDB can include the respective L-2 UE-ID, identification of the respective serving-AP-ID, and a respective action. The serving WiFi AP (for a mobile device 20 served by WFE-1-1) represents the next hop when forwarding data to the mobile device 20 from WFE-1-1. For each mobile device served by another WFE module 212a (such as WFE-N-1 and WFE-N-2) other than WFE-1-1, the FDB can include the respective L-2 UE-ID, identification of the respective serving WFE module 212a, and a respective action. The serving WFE module 212a (for a mobile device 20 served by a WFE module 212a other than WFE-1-1) represents the next hop when forwarding data to that mobile device 20 from WFE-1-1. For a given mobile device 20, the respective action specified in the FDB can be indicative of a transport tunnel (or a respective encapsulation/de-capsulation process) for forwarding data towards that mobile device 20.

TABLE 1

| D-MAC | Next-Hop | Action |
| --- | --- | --- |
| MAC-UE-1 | AP-1-1-1 | EoIP tunnel |
| MAC-UE-2 | WFE-N-1 | EoIP tunnel |
| MAC-UE-3 | WFE-N-2 | EoIP tunnel |

The (UE-ID, serving-AP-ID) bindings maintained at each RAT-specific FE module 212 can be stored separately or as part of the FDB associated with that RAT-specific FE module 212. In some implementations, a FDB can include, for each mobile device 20, other information other than the UE-ID, the next hop identification and the respective action. While the example FDP shown in Table 1 is associated with a WFE module 212a, FDBs for other RAT-specific FE modules (such as LFE 212b) can be defined in a similar way as shown in Table 1. In some implementations, a RAT-specific FE module 212 can be configured to dynamically adjust a respective FDB, for instance, in response to mobility events.

In some implementations, each RAT-specific FE module 212 can include a RAT-specific FE control plane (C-plane) application and a RAT-specific FE data plane (D-plane) application. The RAT-specific FE D-plane application, also referred to herein as RAT-specific FE user-space packet switching (USPS) D-plane application, can be configured to forward data packets (or data frames) towards a respective AP 230 or other entities (such as other RAT-specific FE modules 212) of the EMD 220 based on the FDB maintained at the respective RAT-specific FE module 211. The RAT-specific FE control plane (C-plane) application can be configured to handle signaling with other entities inside or outside the LMD 210 and perform C-plane functions (such as mobility functions) at the RAT-specific FE module 212. For instance, each LFE module 212b can include state machines replicating those associated with a serving gateway (S-GW). Accordingly, the LFE C-plane application and the LFE D-plane application can be viewed as a S-GW C-plane application and a S-GW D-plane application. By maintaining L2 bindings and updating respective tier-2 FDBs when handling L2 mobility events, the RAT-specific FE modules 212 can be configured to abstract the radio-access-type to, and obscure L2 mobility events from, the mobility managers 214.

Each RAT-specific C-plane application (within a respective RAT-specific FE module 212) can be configured to detect and handle L2 mobility events. In particular, the transport tunnels 235 between the RAT-specific FE modules 212 and the RAT-specific APs 230 can be stateless such that the RAT-specific APs 230 do not signal L2 mobility events to the respective serving RAT-specific FE modules 212. Each RAT-specific C-plane application (or RAT-specific FE module 212) can be configured to infer L2 mobility events associated with served RAT-specific APs 230 based on the (UE-ID, serving-AP-ID) bindings maintained at the RAT-specific FE module and information associated with data frames (or data packets) received at the RAT-specific FE module 212. Tier-1 mobility events can be characterized as high-frequency short-range handovers that require low latency in session setup and also are likely to require a large amount of localized state that is not necessarily relevant outside the respective LMD 210. Accordingly, confining handling of tier-1 mobility events within a given LMD 210 to RAT-specific FE modules 212 and the mobility controller 211 in that LMD leads to efficient use of hardware resources in the distributed SDN packet core system and reduces latency with respect to session initiation.

Each LMD 210 includes a respective SDN mobility controller 211 (also referred to herein as mobility controller 211). The SDN mobility controller 211, within each LMD 210, can be communicatively coupled to the RAT-specific FE modules 212, the mobility manager 214, the AAA proxy module 215 and the policy module 216 in that LMD 210. The AAA proxy module 215 can be configured to communicate with the global AAA module 226 and obtain user authentication, authorization or accounting information therefrom. The global AAA module 226 can be a database storing information for authentication, authorization and accounting information for users (or respective mobile devices 20) served by the distributed SDN packet core system. In some implementations, the SDN mobility controller 211 can be configured to access the AAA proxy module 215 or the HSS module 294 to obtain authentication, authorization or accounting information when authenticating a mobile device 20 (or a respective user). In some implementations, the SDN mobility controller 211 can be configured to access the policy module 216 or the PCRF module 296, for instance, to obtain one or more service policies for a mobile device 20 (or a respective user).

Each mobility controller 211 can include a plurality of RAT-specific mobility control applications, each of which is associated with a respective RAT. For instance, the mobility control application associated with LTE can correspond to (or include functions associated with) the mobility management entity (MME). For each RAT, the SDN mobility controller 211 (or the respective RAT specific mobility control application) in a given LMD 210 can be configured to track intra-LMD mobility events in that LMD 210 and cause updating of data forwarding rules associated with the RAT-specific FE modules 212 (for that RAT) and the mobility managers 214. As illustrated in further detail with respect to FIG. 3, the SDN mobility controller 211 in a given LMD 210 can be configured to receive an indication of a L2 mobility event and, in response, cause one or more RAT-specific FE modules 212a in that LMD 210 to update the respective tier-1 FDB(s). In instances where the L2 mobility event involves a mobile device 20 roaming between APs 230 served by separate RAT-specific FE modules 212, the SDN mobility controller 211 can also cause the mobility manager to update a respective tier-2 FDB. In some implementations, the SDN mobility controller 211 can be configured to maintain copies of forwarding rules associated with various RAT-specific FE modules 212 in the LMD 210 of the SDN mobility controller 211. As illustrated in further details with respect to FIGS. 4A, 4B and 5, the SDN mobility controller 211 can be configured to track inter-LMD and inter-RAT mobility events and cause updating of forwarding rules on RAT-specific FE modules 212 and mobility managers 214.

Each LMD 210 also includes a respective mobility manager 214 configured to handle tier-2 mobility events (also referred to herein as layer-3 (L3) mobility events). Tier-2 mobility can be anchored at the mobility managers 214. In particular, each mobility manager 214 can maintain bindings between L3 UE identifiers (such as IP addresses) and identifiers (such as IP addresses) of respective serving RAT-specific FE modules 212. Each mobility manager 214 can include a mobility gateway C-plane application configured to manage L3 forwarding rules and a mobility gateway D-plane application configured to act as a data forwarding entity using the L3 forwarding rules maintained at the mobility manager 214. For instance, in order to handle intra LTE inter-LMD mobility, the mobility manager 214 for each LMD can include state machines replicating the C-plane and D-plane of a packet data network (PDN) gateway (PGW). L3 mobility events are explicitly signaled to the mobility manager 214, for instance, by the mobility controller 211. The mobility gateway C-plane application can be configured to receive an indication of a L3 mobility event from a mobility controller 211 (such as a mobility controller in the same LMD 210) and instruct the respective mobility gateway D-plane application to update L3 forwarding rules maintained at the mobility manager 214 to reflect the L3 mobility event.

Considering the example discussed with respect to Table 1 above, Table 2 shows a tier-2 FDB or a portion thereof (such as the L3 forwarding rules) maintained at the mobility manager 214 of LMD-1. For each UE, the tier-2 FDB can include an indication of the IP address of that UE, the IP address of the serving RAT-specific FE module (representing the next hop towards the UE) and an action indicative of a transport tunnel (or respective encapsulation/de-capsulation processes). When a UE roams between two RAT-specific FE modules 212 associated with separate LMDs or associated with distinct RATs within the same LMD, the target mobility manager 214 can update its tier-2 FDB to reflect the change in the serving RAT-specific FE module 212 for that UE. The change can also be propagated to other mobility managers in other LMDs through the global SDN mobility controller 292.

TABLE 2

| UE-IP | Next-Hop | Action |
| --- | --- | --- |
| IP-UE-1 | WFE-1-1 | IP-in-IP tunnel |
| IP-UE-2 | WFE-N-1 | IP-in-IP tunnel |
| IP-UE-3 | WFE-N-2 | IP-in-IP tunnel |

The global SDN mobility controller 292 can be configured to track inter-LMD mobility events and cause updating of L3 data forwarding rules (or tier-2 FDBs) in mobility managers 214. In some implementations, upon a mobility manager 214 updating a respective tier-2 FDB in response to an inter-LMD mobility event, the mobility manager 214 can send an indication of such update to the global SDN mobility controller 292. In response, the global SDN mobility controller 292 can then forward the indication of the update to other mobility managers 214 in other LMDs 210. Accordingly, mobility managers 214 of separate LMDs 210 can be configured to maintain similar tier-2 FDBs.

Figure 3:
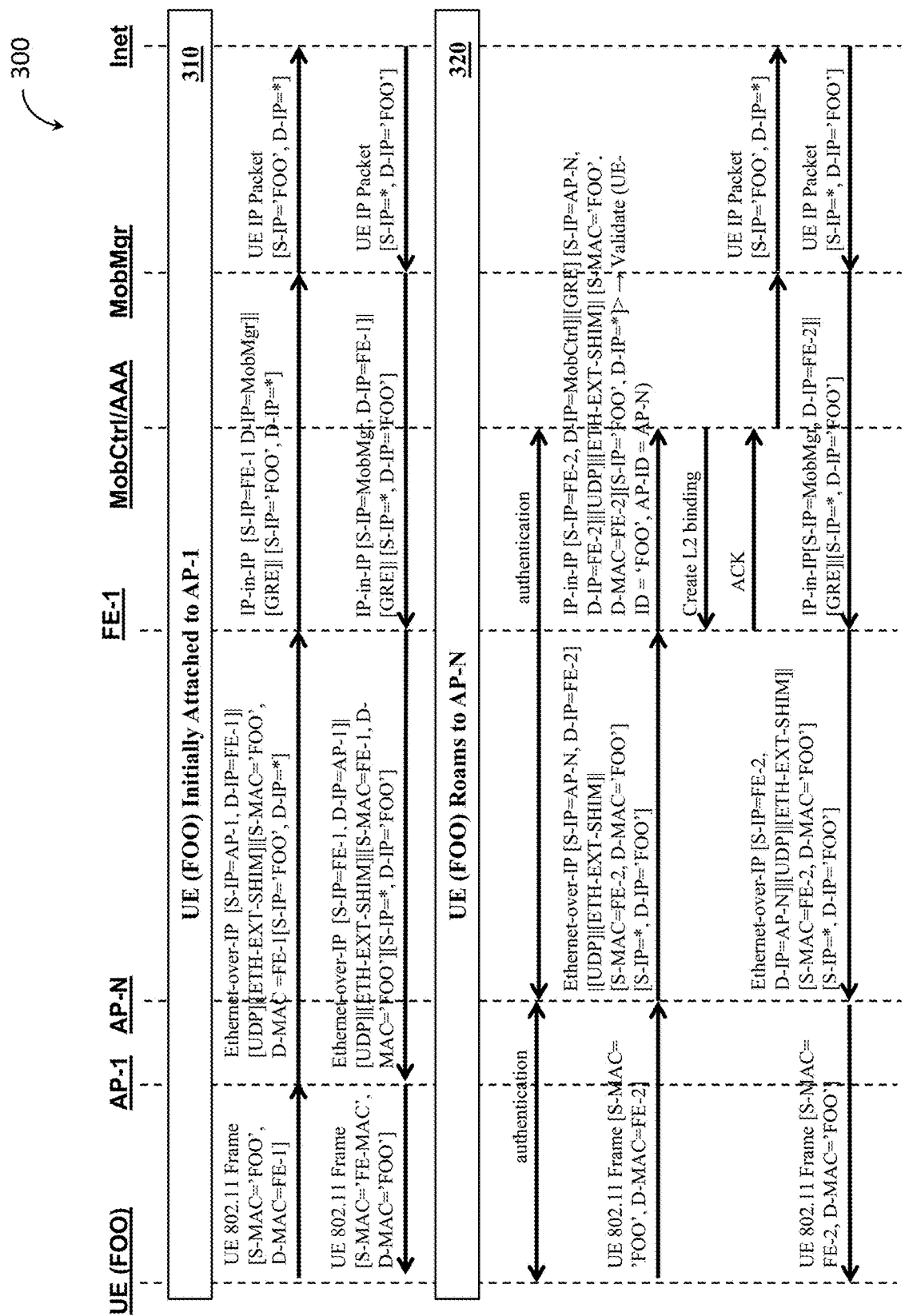
FIG. 3 is a flow diagram illustrating an example method of handling a tier-1 mobility event.

FIG. 3 is a flow diagram illustrating a method 300 of handling a tier-1 mobility event. The tier-1 mobility event shown in FIG. 3 involves a handover between two APs (such as AP-1 and AP-N) that are served by the same LMD 210 and that are associated with the same RAT (e.g., both APs are WiFi APs or both are eNodeBs). The UE is served via the access point AP-1 by the RAT-specific FE module FE-1. The method 300 can include a first phase 310 during which a user equipment (UE) "FOO," such as mobile device 20, is initially attached to the first access point AP-1 and a second phase 320 during which the UE roams from the first access point AP-1 to the second access point AP-N. During the first phase 310, the UE can, for instance, request and receive Internet or cloud data through AP-1. During the second phase, the UE continues accessing the Internet or cloud data after roaming to AP-N.

In some implementations, the UE generates a request for Internet or cloud data. In some implementations, the request can be generated as a data frame (such as a UE 802.11 frame) or a data packet. The request can include identifications of the UE and the access point AP-1 to which the UE is attached. For instance, the request (or data frame) can include indication of the MAC addresses of the UE and access point AP-1. Upon receiving the request, AP-1 encapsulates the data request according to the transport tunnel (such as EoIP tunnel) employed between the access point AP-1 and the RAT-specific FE module FE-1. As part of the encapsulation, the access point AP-1 can insert its IP address (as a source IP address) and the IP address of the FE module (as a destination IP address). In some implementations, the access point AP-1 can also insert the IP address of the UE (initial source IP address) and the final destination IP address as part of the encapsulation. The initial source IP address and the final destination IP address can be retrieved from the request received from the UE. Upon receiving the encapsulated request, the RAT-specific FE module FE-1 forwards the request to the mobility manager (MobMgr) of the LMD 210. In some implementations, forwarding the request can include de-capsulating the respective data frame and employing another encapsulation according to a transport protocol (such as GRE protocol) employed between the RAT-specific FE module FE-1 and the mobility manager. For instance, the FE module FE-1 can add its IP address (as a source address) and the mobility manager IP address (as a destination IP address). The mobility manager receives and de-capsulates the request and then forward a respective UE data packet to the final destination (such as a data center 90 or on-network cache 218 shown in FIGS. 2A and 2B). Upon receiving a response (such as one or more data packets) from the final destination, the mobility manager encapsulates and forwards the data packet(s) to the RAT-specific FE module FE-1. The RAT-specific FE module FE-1 then forwards the data packet(s) to the access point AP-1 after applying proper de-capsulation and/or encapsulation. The access point AP-1 sends the received data packets to the UE.

During the second phase 320, the UE detaches from the access AP-1 and attaches to the access point AP-N. In some implementations, attachment to the access point AP-N can include authentication of the UE. In some implementations, the authentication process can be optional. The authentication process can include the access point AP-N requesting the mobility controller (MobCtrl) to authenticate the UE. The mobility controller requests UE authentication information from the AAA proxy module (such as AAA proxy module 215 shown in FIG. 2B). The mobility controller then sends an authentication response to the access point AP-N.

After attaching to the access point AP-N, the UE generates and transmits a data request for requesting data associated with a data center 90 or the on-network cache 218. Similar to the first phase 310, the data request can be generated as a data frame (such as a UE 802.11 frame) or a data packet. Based on its tier-1 FDB, the access point AP-N can identify the RAT-specific FE module FE-1 as the one serving the UE. The access point AP-N, upon receiving the data request, encapsulates the data request according to a transport tunnel employed between AP-N and the RAT-specific FE module FE-1 and forwards the encapsulated data request to the RAT-specific FE module FE-1.

Upon receiving the data request, the RAT-specific FE module FE-1 (or the respective FE C-plane application) (i) retrieves the UE-ID (such as MAC address) and the identification of AP-N (such as the TED associated with AP-N) from the received data frame and (ii) compares the retrieved (UE-ID, AP-N-ID) to the list of (UD-ID, serving-AP-ID) bindings maintained at the FE module FE-1. The RAT-specific FE module FE-1 (or the respective FE C-lane application) can determine based on the comparison that the (UE-ID, serving-AP-ID) bindings maintained (or accessed) by the RAT-specific FE module FE-1 indicate that UE "FOO" is served by AP-1 whereas the (UE-ID, AP-N-ID) retrieved from the data frame indicates that UE "FOO" is served by AP-N. Based on such determination, the RAT-specific FE module FE-1 infers an occurrence of an L2 mobility event. That is, the RAT-specific FE module FE-1 infers that UE "FOO" just attached to AP-N after detaching from AP-1. In response to such inference, the RAT-specific FE module FE-1 forwards the received request, for instance, after further de-capsulation/encapsulation, to the mobility controller (MobCtrl) and requests validation (or approval) of a binding between the UE and AP-N. In response, the mobility controller (MobCtrl) updates a respective list of (UE-ID, serving-AP-ID) bindings and sends a request to the RAT-specific FE module FE-2 requesting (or indicating) creation of a new L2 binding between UE "FOO" and AP-N. The RAT-specific FE module FE-1 then updates the respective list of L2 bindings and/or the respective FDB to include the new L2 binding between UE "FOO" and AP-N and remove the previous L2 binding between the same UE and the access point AP-1. The RAT-specific FE module FE-1 then sends an acknowledgement message to the mobility controller. In some implementations, the mobility controller can send an updated set of L2 bindings (updated by the mobility controller) or a portion thereof to the RAT-specific FE module FE-1, which can then update its list of L2 bindings and its tier-1 FDB accordingly.

The mobility controller then forwards the data request to the final destination, for instance, through the mobility manager (MobMgr). In some implementations, the mobility controller (MobCtrl) can forward the data request to the final destination directly. In some implementations, the data request can be forwarded by the RAT-specific FE module FE-1 through the mobility manager. Data packets from the final destination can then be forwarded to the UE "FOO" through, the mobility manager, the RAT-specific FE module FE-1 and the access point AP-N. Also, data originating from UE "FOO" is now routed through AP-N. While the method 300 is described with respect to requests for data originating at the UE, the method 300 can also be employed when the UE roams between two APs while communicating with another UE.

Inferring L2 mobility events based on monitoring of (UE-ID, serving-AP-ID) bindings by the RAT-specific FE modules 212 instead of having the RAT-specific APs 230 explicitly signaling intra-LMD mobility events allows for retaining control of UE tracking within the distributed SDN packet core system. That is, radio access networks and respective RAT-specific APs 230 have no access to UE IP address assignment information therefore ensuring stable UE IP address assignment within the distributed SDN packet core system. As a result, the complexity and cost of the RAT-specific APs 230 can be reduced. In other words, the RAT-specific APs 230 can be configured to function as transport (such as Ethernet) bridges. In some implementations, RAT-specific FE modules 212 can be configured to terminate the transport tunnels 235 with respective RAT-specific APs 230.

Figure 4A:
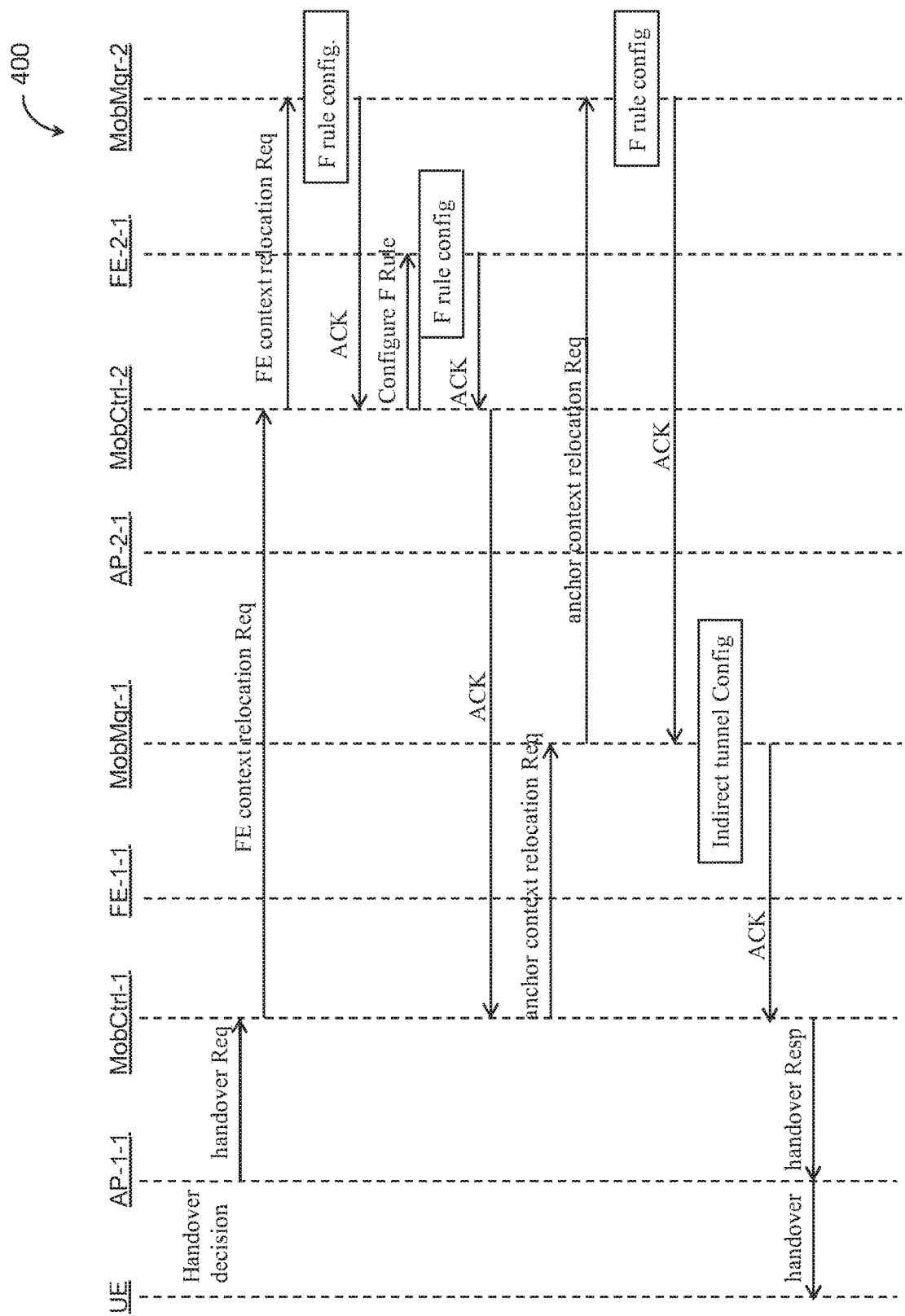
FIGS. 4A and 4B show a flow diagram illustrating an example method for handling an inter-LMD mobility event.
Figure 4B:
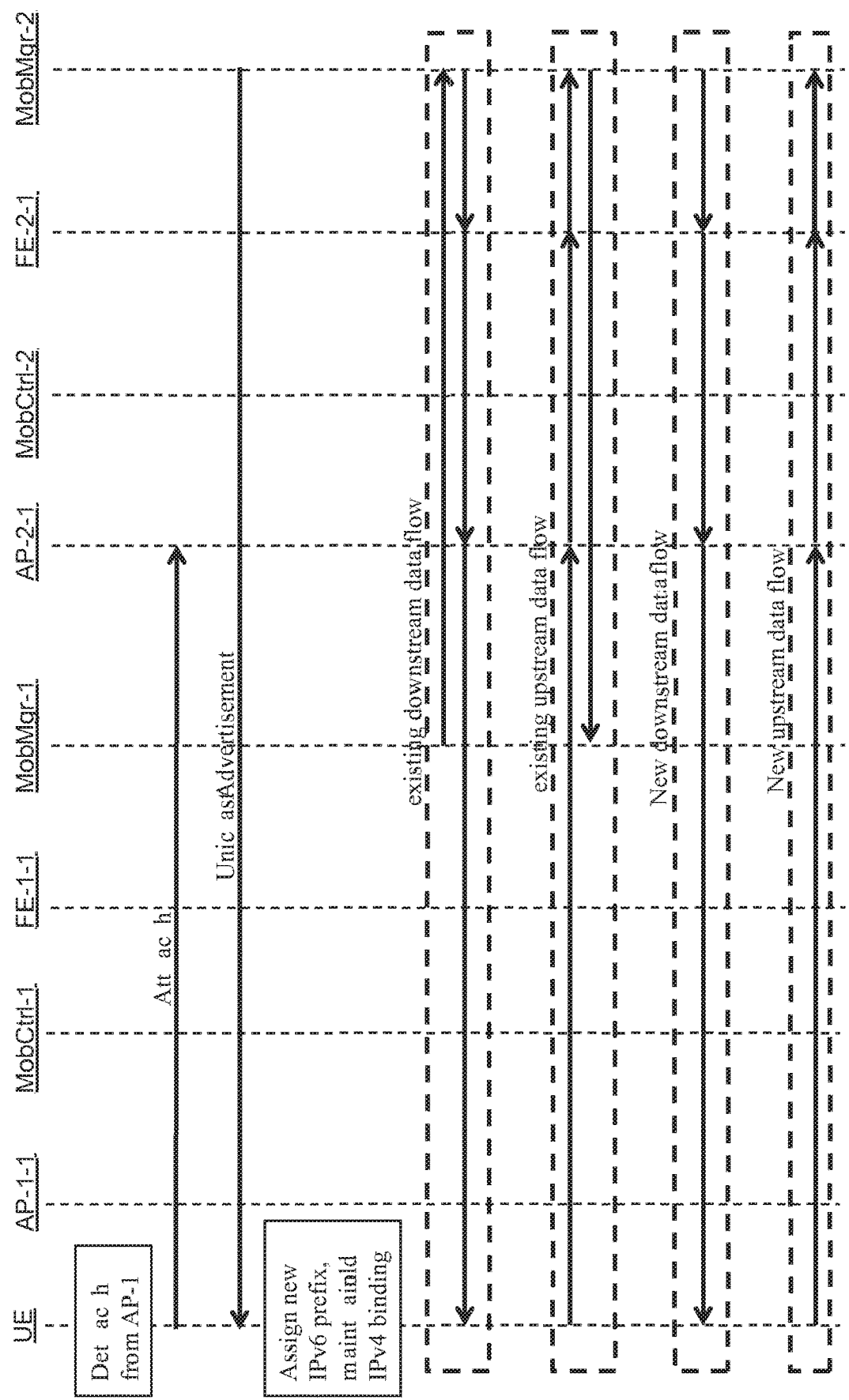

FIGS. 4A and 4B show a flow diagram illustrating a method 400 for handling an inter-LMD mobility event, where a UE is roaming from a first LMD (such as LMD-1) to a second LMD (such as LMD-2). In some implementations, the UE makes a handover decision, for instance, based on the strength of signals received from a first and second RAT-specific access point AP-1-1 and AP-2-1 associated with LMD-1 and LMD-2, respectively. Once a roaming decision is made, the access point AP-1-1 to which the UE is currently attached sends a handover request to the SDN mobility controller of LMD-1. The handover request can include identifications of the UE, the first (or source) access point AP-1 and the second (or target) access point AP-2. Responsive to the handover request, the SDN mobility controller of LMD-1 sends a FE relocation context request to the SDN mobility controller in of LMD-2. The FE relocation context request can include the UE-ID, serving-AP-ID (such as the TEID associated with AP-1), one or more data flow rules or a combination thereof. In some implementations, the FE relocation context request can also include an identification of the target access point AP-2-1.

In some implementations, upon receiving the FE relocation request, the SDN mobility controller determines the RAT-specific FE module (i.e., FE-2-1) serving the target access point AP-2-1, for instance, based on information maintained by the SDN mobility controller of LMD-2. The SDN mobility controller (MobCtrl-2) in LMD-2 then forwards the FE context relocation request to the mobility manager (MobMgr-2) in LMD-2 and sends a request to the target RAT-specific FE module FE-2-1 to update its tier-1 FDB. In response to the forwarded FE context relocation request, the mobility manager MobMgr-2 updates the respective tier-2 FDB to reflect that the UE is now served by the target RAT-specific FE module FE-2-1. For instance, a mobility gateway C-plane application (associated with a the same RAT as FE-2-1) of the mobility manager MobMgr-2 can receive the FE context relocation request and, in response, cause the respective gateway D-plane application to update the tier-2 FDB (or L3 bindings) maintained by the mobility manager MobMgr-2. Once rules in the tier-2 FDB (or L3 bindings) are updated, the mobility manager MobMgr-2 sends an acknowledgment to the SDN mobility controller MobCtrl-2. The target RAT-specific FE module FE-2-1 updates the respective tier-1 FDB (or L2 bindings) in response to receiving the request from the SDN mobility controller MobCtrl-2. For instance, the FE C-plane application of the RAT-specific FE module FE-2-1 can receive the request from the SDN mobility controller MobCtrl-2 and instruct the respective FE D-plane application to update the tier-1 FDB maintained by FE-2-1. Once rules in the tier-1 FDB (or LE bindings) maintained by FE-2-1 are updated, the RAT-specific FE module FE-2-1 sends an acknowledgment to the SDN mobility controller MobCtrl-2. The SDN mobility controller MobCtrl-2 then informs the SDN mobility controller MobCtrl-1 associated with LMD-1 that the FE context relocation process at LMD-2 is complete. In some implementations, the SDN mobility controller MobCtrl-1 associated with LMD-1 can cause the source RAT-specific FE module FE-1-1 to update its tier-1 FDB to indicate that the UE is now served by FE-2-1.

Once the mobility controller MobCtrl-1 associated with LMD-1 receives an acknowledgment that the FE context relocation process is complete at LMD-2, the mobility controller MobCtrl-1 sends an anchor context relocation request to the mobility manager MobMgr-1 in the source LMD (LMD-1). The mobility manager MobMgr-1 forwards the anchor context relocation request to the target mobility manager MobMgr-2. The anchor context relocation request can include an identification of the UE (such as the respective IP address), rules for existing data flows, identifications of source and target mobility managers MobMgr-1 and MobMgr-2, and/or other information. In response to the anchor context relocation request, the target mobility manager MobMgr-2 configures one or more indirect upstream tunnel forwarding rules indicating that data flows associated with existing session(s) are to be routed through the source mobility manager MobMgr-1. Once the anchor context relocation process is complete at the target mobility manager MobMgr-2, the target mobility manager MobMgr-2 sends a respective acknowledgment to the source mobility manager MobMgr-1. In response to the received acknowledgment, the source mobility manager MobMgr-1 configures indirect downstream tunnel forwarding rules indicating that downstream data traffic associated with existing sessions is to be routed through the target mobility manager MobMgr-2. Once, the anchor context relocation processes at the source and target mobility managers MobMgr-1 and MobMgr-2 are complete, the source mobility manager MobMgr-1 sends an acknowledgement to the source mobility controller MobCtrl-1, which in turn sends a handover response to the source access point AP-1-1. The source access point AP-1-1 sends a handover command to the UE. In some implementations, the IP address of the UE does not change after the anchor context relocation processes at the source and target mobility managers are performed. At this stage, a direct tunnel through the target mobility manager MobMgr-2 for new sessions and an indirect tunnel between the source and target mobility managers MobMgr-1 and MobMgr-2 for existing sessions are already built for routing data traffic associated with the UE.

In some implementations, once the tier-1 and tier-2 FDBs at the target access point AP-2-1 and the target RAT-specific FE module FE-2-1 are updated, the source SDN mobility controller MbCtrl-1 sends an indication of the change with respect to the RAT-specific FE module serving the UE to the global SDN mobility controller 292 (shown in FIGS. 2A and 2B). In response, the global SDN mobility controller 292 sends requests to mobility managers in other LMDs to instruct them to update their tier-2 FDBs to reflect that the UE is served by the RAT-specific FE module FE-2-1

In response to the handover command, the UE detaches from the source access point AP-1-1 and attaches to the target access point AP-2-1. The target mobility manager MobMgr-2 transmits a unicast message to the UE. The unicast message can include an indication of a new IPv6 prefix for use by the UE instead of a previously used old IPv6 prefix. The unicast message can also include an indication to the UE to maintain a previously used IPv4 prefix. At this stage, the UE can continue receiving or sending data associated with existing session or can initiate new sessions through the target RAT-specific access point AP-2-1. In particular, downstream data flow associated with exiting session(s) (session(s) started before the roaming process and continued thereafter) are routed from the source mobility manager MobMgr-1 towards the target mobility manager MobMgr-2, which forwards such traffic to the target RAT-specific FE module FE-2-1. The target RAT-specific FE module FE-2-1 forwards the downstream traffic associated with existing session(s) to the UE through the target access point AP-2-1. Also, upstream traffic associated with exiting session(s) is routed from the UE to the target RAT-specific FE module FE-2-1 through the target access point AP-2-1. The target RAT-specific FE module FE-2-1 forwards the upstream data flow to the target mobility manager MobMgr-2, which forwards the same upstream data flow to the source mobility manager MobMgr-2. Upstream and downstream data flows for new sessions (such as sessions initiated after the roaming process) are routed through the established direct tunnel without involvement of the source mobility manager MobMgr-1.

Figure 5:
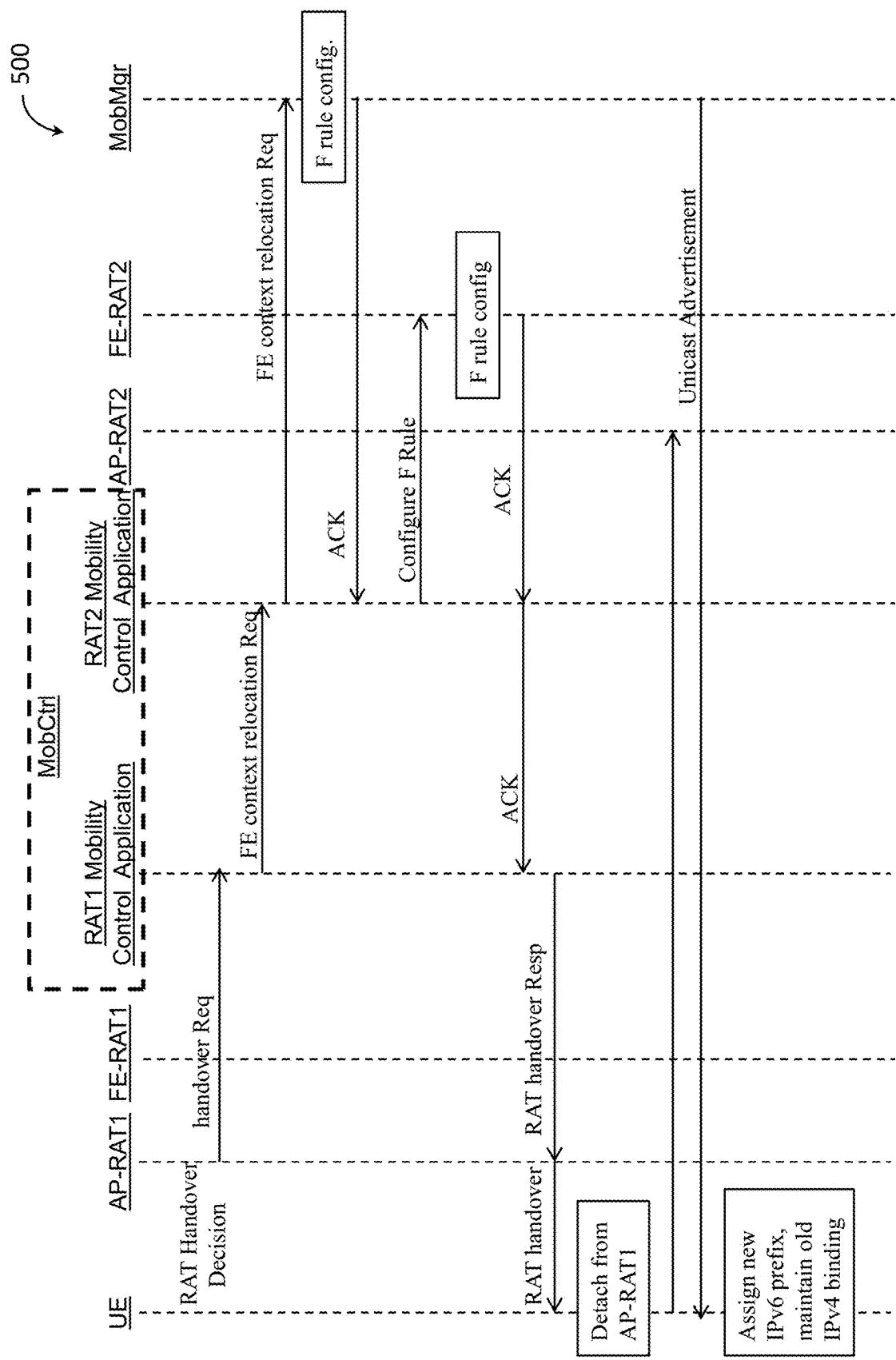
FIG. 5 is a flow diagram illustrating a method for handling an inter-RAT mobility event, where a UE is roaming from a first AP associated with a first RAT to a second AP associated with a second RAT.

FIG. 5 is a flow diagram illustrating a method 500 for handling an inter-RAT mobility event, where a UE is roaming from a first AP (such as AP-RAT1) associated with a first RAT (RAT1) to a second AP (such as AP-RAT2) associated with a second RAT (RAT2). The first and second APs AP-RAT1 and AP-RAT2 are served by the FE-RAT1 modules FE-RAT2, respectively. The RAT-specific FE modules FE-RAT1 modules FE-RAT2 are located in the same LMD and are associated with RAT1 and RAT2, respectively. For instance, RAT1 can be Wi-Fi and RAT2 can be LTE or vice versa. In general, RAT1 and RAT2 can be any two RATs supported by the distributed SDN packet core system.

A UE served by the AP AP-RAT1 makes a decision to switch from using RAT1 to using RAT2. For instance, while connected to, and served by, a LMD via LTE or 3G, the UE may decide to switch to Wi-Fi upon detecting a Wi-Fi signal indicative of a Wi-Fi AP in proximity. In other instances, the UE may decide to switch from Wi-Fi to LTE (or 3G) upon detection of substantial reduction in Wi-Fi signal strength. The decision of switching between RAT1 and RAT2 may be triggered at the UE by an input from a respective user or may be triggered automatically by the UE, for instance, based on detected signal strength for one or more RATs, setting of the UE, application settings or a combination thereof.

Once a switching (or handover) decision is made, the UE sends a handover request and the access point AP-RAT1 to which the UE is currently attached forwards the handover request to the SDN mobility controller (MobCtrl). The handover request can include an indication of the second radio access technology RAT2 the UE wants to switch to, an identifications of the UE, identification of the first (or source) access point AP-RAT1, identification of the second (or target) access point AP-RAT2 or a combination thereof. A mobility control application of the SDN mobility controller MobCtrl associated with the radio access technology RAT1 receives the handover request. Responsive to the handover request, the mobility control application associated with RAT1 sends a FE relocation context request to another mobility control application of the SDN mobility controller associated with RAT2. The FE relocation context request can include the UE-ID, serving-AP-ID (such as the TED associated with AP-RAT1), one or more data flow rules or a combination thereof. In some implementations, the FE relocation context request can also include an identification of the target access point AP-RAT2.

The mobility control applications associated with RAT1 and RAT2 are configured to handle signaling or other mobility control functions associated with the radio access technologies RAT1 and RAT2, respectively. For instance, such mobility control applications can include an application implementing mobility functions or state machines corresponding to a MME if RAT1 or RAT2 corresponds to LTE. In some implementations, the mobility control applications associated with various RATs supported by the distributed SDN packet core system can be implemented as separate SDN entities. In such implementations, the SDN mobility controller MobCtrl can be a collection of separate SDN mobility modules associated with separate RATs.

In some implementations, upon receiving the FE relocation request, the mobility control application associated with RAT2 can determine the RAT-specific FE module (i.e., FE-RAT2) serving the target access point AP-RAT2, for instance, based on information maintained by the SDN mobility controller MobCtrl. The mobility control application associated with RAT2 then forwards the FE context relocation request to the mobility manager (MobMgr) in the same LMD. In response to the forwarded FE context relocation request, the mobility manager MobMgr updates its tier-2 FDB to reflect that the UE is now served by the target RAT-specific FE module FE-RAT2. For instance, a mobility gateway C-plane application of the mobility manager MobMgr associated with RAT2 can receive the FE context relocation request and, in response, cause the respective gateway D-plane application to update the tier-2 FDB (or L3 bindings) associated with the mobility manager MobMgr. In some implementations, the mobility manager MobMgr can be associated with multiple tier-2 FDBs each of which is associated with a respective RAT. In such implementations, the tier-2 FDB associated with RAT 2 is updated. Once rules in the tier-2 FDB (or L3 bindings) are updated, the mobility manager MobMgr sends an acknowledgment to the mobility control application associated with RAT2.

The mobility control application associated with RAT2 also sends a request to the target RAT-specific FE module FE-RAT2 to update its tier-1 FDB of FE-RAT2. The target RAT-specific FE module FE-RAT2 updates the respective tier-1 FDB (or L2 bindings) in response to receiving the request from the mobility control application associated with RAT 2. For instance, the FE C-plane application of the RAT-specific FE module FE-RAT2 can receive the request from the mobility control application associated with RAT 2 and instruct the respective FE D-plane application to update the tier-1 FDB maintained by FE-RAT2. The updated tier-1 FDB indicates that the target access point AP-RAT2 is serving the UE. Once rules in the tier-1 FDB (or LE bindings) maintained by FE-RAT2 are updated, the RAT-specific FE module FE-RAT2 sends an acknowledgment to the mobility control application associated with RAT2. The mobility control application associated with RAT2 then informs the mobility control application associated with RAT1 that the forwarding rules at the target access point AP-RAT2 and the target RAT-specific FE module FE-RAT2 are complete.

The mobility control application associated with RAT1 then sends a handover response to the source access point AP-RAT1 and the source access point AP-RAT1 sends a handover command to the UE. The mobility control application associated with RAT1 (or the SDN mobility controller MobCtrl) can also instruct the source RAT-specific FE module FE-RAT 1 to update its tier-1 FDB by deleting any binding between the UE and AP-RAT1. The source RAT specific FE module FE-RAT1 can update such binding with information indicating the UE is served by FE-RAT2. In response to the handover command, the UE detaches from the source access point AP-RAT1 and attaches to the target access point AP-RAT2. The mobility manager MobMgr transmits a unicast message to the UE. The unicast message can include an indication of a new IPv6 prefix for use by the UE instead of a previously used old IPv6 prefix. The unicast message can also include an indication to the UE to maintain a previously used IPv4 prefix.

In some implementations, once the tier-1 and tier-2 FDBs at the target access point AP-RAT2 and the target RAT-specific FE module FE-RAT2 are updated, the SDN mobility controller MbCtrl (e.g., the mobility control application associated with RAT1) sends an indication of the change with respect to the RAT-specific FE module serving the UE to the global SDN mobility controller 292 (shown in FIGS. 2A and 2B). In response, the global SDN mobility controller 292 sends requests to mobility managers in other LMD to update their tier-2 FDBs to reflect that the UE is served by the RAT-specific FE module FE-RAT2.

While FIGS. 3 and 4A and 4B refer to transport protocols for signaling between distinct SDN entities of a LMD 210, such signaling can be implemented through remote procedure calls (RPCs). Accordingly, mobility events can be signaled as validated RPCs without requiring special protocol layers (such as GTP, PMIPv6, etc.) for signaling or any additional layers for message validation (such as IPSec).

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A distributed software defined network (SDN) packet core system comprising:
   a plurality of interconnected local SDN infrastructure instances, each local SDN infrastructure instance corresponding to a respective local mobility domain (LMD) and including a plurality of processors arranged geographically in proximity, and communicatively coupled, to a respective plurality of radio access technology (RAT) specific access points, the processors for each local SDN infrastructure instance being configured to execute:
      a plurality of RAT-specific front-end modules associated with at least one RAT, each RAT-specific front-end module being configured to handle intra-RAT and intra-LMD mobility events that involve switching connectivity of a plurality of client devices between two radio access points coupled to one or more of the plurality of local SDN infrastructure instances and associated with a first common RAT that is also associated with the plurality of RAT-specific front-end modules;
      a mobility manager coupled to the plurality of RAT-specific front-end modules and configured to:
         handle intra-RAT and inter-LMD mobility events that involve switching connectivity of the plurality of client devices between two radio access points coupled to separate local SDN infrastructure instances and associated with a second common RAT, and
         maintain a data structure that includes, for each client device attached to the distributed SDN packet core system, a binding between an Internet protocol (IP) address of a respective client device and an IP address of a front-end module serving a respective client device,
         wherein handling intra-RAT and inter-LMD mobility events includes:
            receiving, by the mobility manager, a request for a data structure update from a SDN mobility controller of the one or more of the plurality of local SDN infrastructure instances responsive to a handover request associated with the respective client device; and
            updating the data structure by changing a first IP address of a first RAT-specific front-end module previously serving the respective client device with a second IP address of a second RAT-specific front-end module, a second RAT-specific front-end module located in a different LMD than the first RAT-specific front-end module.

2. The distributed SDN packet core system of claim 1, wherein the processors for each local SDN infrastructure instance are further configured to cause the SDN mobility controller to:
   track intra-LMD mobility events that involve switching between two radio access points coupled to a given local SDN infrastructure instance; and
   coordinate handling of the intra-LMD mobility events with the plurality of RAT-specific front-end modules and the mobility manager of the given local SDN infrastructure instance.

3. The distributed SDN packet core system of claim 1, wherein each RAT-specific front-end module is configured to maintain a data structure including, for each client device served by a given RAT-specific front-end module, a binding between an identifier of a respective client device and an identifier of a radio access point serving the respective client device.

4. The distributed SDN packet core system of claim 3, wherein the identifier of the respective client device includes a media access control (MAC) address of the respective client device.

5. The distributed SDN packet core system of claim 3, wherein the identifier of the radio access point serving the respective client device includes a tunnel endpoint identifier (TEID) associated with a transport tunnel between the radio access point and the RAT-specific front-end module.

6. The distributed SDN packet core system of claim 5, wherein the transport tunnel between the radio access point and the RAT-specific front-end module includes at least one of:
   an Ethernet over Internet protocol (IP) tunnel;
   a generic user datagram protocol (UDP) encapsulation (GUE) tunnel;
   a generic route encapsulation (GRE) tunnel;
   a 802.11 over GUE tunnel;
   a general packet radio service (GPRS) Tunneling Protocol (GTP) tunnel;
   or an Internet Protocol (IP) security (IPSec) tunnel.

7. The distributed SDN packet core system of claim 3, wherein the data structure includes a data packet forwarding rule for applying to data packets associated with the respective client device and radio access point serving the respective client device.

8. The distributed SDN packet core system of claim 3, wherein the identifier of the respective client device is a first client device identifier and the identifier of the radio access point serving the respective client device is a first radio access point identifier and wherein handling inter-RAT and intra-LMD mobility events includes:
   retrieving, by one of the plurality of RAT-specific front-end modules, from a data frame received from the respective client device a second client device identifier and a second radio access point identifier;
   determining, by the RAT-specific front-end module, based on the first and second client device identifiers and the first and second radio access point identifiers that the respective client device switched between two separate radio access points coupled to the local SDN infrastructure instance and associated with the first common RAT; and updating, by the RAT-specific front-end module, the binding between the first client device identifier and the first radio access point identifier to reflect a binding between the first client device identifier and the second radio access point identifier.

9. The distributed SDN packet core system of claim 8, wherein handling intra-RAT and intra-LMD mobility events further includes:

sending, by the RAT-specific front-end module to the SDN mobility controller of the one or more of the plurality of local SDN infrastructure instances, information indicating that the respective client device switched between two separate radio access points coupled to the one or more of the plurality of local SDN infrastructure instances and associated with the first common RAT; and receiving, from the SDN mobility controller, a request to create a new binding between the first client device identifier and the second radio access point identifier, wherein updating the binding between the first client device identifier and the first radio access point identifier includes creating new binding between the first client device identifier and the second radio access point identifier responsive to the request.

10. The distributed SDN packet core system of claim 1, wherein the data structure includes a data packet forwarding rule for applying to data packets originating at or destined to the respective client device.

11. The distributed SDN packet core system of claim 1, wherein the data structure is a first data structure and the SDN mobility controller is configured to:

send a request to the second RAT-specific front-end module requesting update to a second data structure of the second RAT-specific front-end module, the second data structure including bindings between identifiers of client devices served by the second RAT-specific front end module and identifier of radio access points serving those client devices.

12. The distributed SDN packet core system of claim 11, wherein the second RAT-specific front-end module is configured to:

update the second data structure by changing a first access point identifier of a first access point associated with the respective client device with a second access point identifier of a second access point, the first and second access points associated with a common RAT and coupled to different LMDs.

13. The distributed SDN packet core system of claim 1, wherein the at least one RAT includes two or more RATS and wherein the mobility manager is further configured to handle inter-RAT and intra-LMD mobility events that involve switching connectivity of a first client device of the plurality of client devices between two radio access points coupled to the one or more of the plurality of local SDN infrastructure instances and associated with distinct RATs.

14. The distributed SDN packet core system of claim 13, wherein handling inter-RAT and intra-LMD mobility events includes:

receiving, by the mobility manager from the SDN mobility controller, a request for updating the data structure responsive to a handover request associated with the first client device; and updating the data structure by changing the first IP address of the first RAT-specific front end module previously serving the first client device with the second IP address of the second RAT specific front-end module, the first and second RAT-specific front-end modules located in a single LMD and are associated with different RATs.

15. The distributed SDN packet core system of claim 14, wherein the data structure is a first data structure and the SDN mobility controller is configured to:

send a request to the second RAT-specific front-end module requesting update of a second data structure of the second RAT-specific front-end module, the second data structure including bindings between an identifier of each client device served by the second RAT-specific front-end module and an identifier of each radio access serving the client device served by the second RAT-specific front-end module.

16. The distributed SDN packet core system of claim 15, wherein the second RAT-specific front-end module is configured to:

update the second data structure by changing a first access point identifier of a first access point associated with the respective client device with a second access point identifier of a second access point, the first and second access points associated with different RATs.

17. The distributed SDN packet core system of claim 1 further comprises a global SDN mobility controller configured to:

track inter-LMD mobility events; and coordinate handling of intra-RAT and inter-LMD mobility events between a first mobility manager of a first local SDN infrastructure instance of the plurality of local SDN infrastructure instances and at a second mobility manager of a second local SDN infrastructure instance of the plurality of local SDN infrastructure instances.

18. The distributed SDN packet core system of claim 1, wherein the SDN mobility controller is located within one of the plurality of local infrastructure instances.

19. The distributed SDN packet core system of claim 1, further comprising a SDN mobility controller within each respective LMD and communicatively coupled to the plurality of RAT-specific front end modules and the mobility manager, each SDN mobility controller configured to cause updating of forwarding rules on the plurality of RAT-specific front-end modules and mobility manager.

* * * * *